(12) United States Patent
Hoshi

(10) Patent No.: US 7,226,029 B2
(45) Date of Patent: Jun. 5, 2007

(54) ACCESSORY HOLDER

(75) Inventor: Shouichi Hoshi, Yokohama (JP)

(73) Assignee: Nifco Inc., Yokohama, Kanagawa (JP)

( * ) Notice: Subject to any disclaimer, the term of this patent is extended or adjusted under 35 U.S.C. 154(b) by 15 days.

(21) Appl. No.: 11/190,866

(22) Filed: Jul. 28, 2005

(65) Prior Publication Data

US 2006/0027722 A1   Feb. 9, 2006

(30) Foreign Application Priority Data

Aug. 5, 2004   (JP)   ............................ 2004-229906

(51) Int. Cl.
*A47K 1/08* (2006.01)
(52) U.S. Cl. .................. 248/311.2; 224/282; 224/484; 224/926; 296/37.1
(58) Field of Classification Search ............ 248/311.2; 224/282, 275, 926, 484; 295/37.8
See application file for complete search history.

(56) References Cited

U.S. PATENT DOCUMENTS

| | | | | |
|---|---|---|---|---|
| 1,346,174 | A * | 7/1920 | Canner | 232/42 |
| 5,520,313 | A * | 5/1996 | Toshihide | 224/539 |
| 5,620,122 | A * | 4/1997 | Tanaka | 224/275 |
| 5,718,405 | A * | 2/1998 | Adachi | 248/311.2 |
| 5,921,519 | A * | 7/1999 | Dexter et al. | 248/311.2 |
| 6,019,334 | A * | 2/2000 | Shinomiya | 248/311.2 |
| 6,682,116 | B1 * | 1/2004 | Okumura | 296/37.8 |
| 6,685,152 | B2 * | 2/2004 | Shirase et al. | 248/311.2 |
| 6,702,352 | B2 * | 3/2004 | Nakanishi et al. | 296/24.34 |
| 6,715,727 | B2 * | 4/2004 | Sambonmatsu | 248/311.2 |
| 2002/0171018 | A1 * | 11/2002 | Harada | 248/311.2 |
| 2003/0071047 | A1 * | 4/2003 | Harada | 220/835 |
| 2003/0155476 | A1 * | 8/2003 | Nakaya | 248/311.2 |
| 2003/0155477 | A1 * | 8/2003 | Schaal | 248/311.2 |
| 2006/0037984 | A1 * | 2/2006 | Misumi | 224/282 |

FOREIGN PATENT DOCUMENTS

| | | |
|---|---|---|
| EP | 1 190 896 | 3/2002 |
| GB | 2 394 705 | 5/2004 |
| JP | 6-32199 | 4/1994 |
| JP | 11-189257 | 7/1999 |
| JP | 2003-48474 | 2/2003 |
| JP | 3475155 | 9/2003 |

* cited by examiner

*Primary Examiner*—Ramón O. Ramirez
*Assistant Examiner*—Bradley Duckworth
(74) *Attorney, Agent, or Firm*—Manabu Kanesaka

(57) ABSTRACT

An accessory holder includes a tubular holder body having an opening at the top and a bottom upon which a small article inserted from the opening can be rested. The device includes a foldable tray, a biasing device and a damping device. The foldable tray is rotatably supported at mid height of the accessory holder and holds the small article by rotating from a vertical folded position to a horizontal bottom-raising position. The biasing device is provided between the foldable tray and the tubular holder body to bias the foldable tray from the horizontal bottom-raising position towards the vertical folded position. The damping device damps the rotational force of the foldable tray and may be rotated by the bias force of the biasing device. A locking device locks the foldable tray in the vertical folded position against the bias force of the biasing device.

5 Claims, 20 Drawing Sheets

ACCESSORY HOLDER

BACKGROUND OF THE INVENTION AND RELATED ART STATEMENT

The present invention relates to accessory holders, such as a cup holder installable, for example, in a vehicle, that are capable of lowering or raising their bottoms.

Conventionally, as one example of such accessory holders, a cup holder capable of varying its depth by opening or closing a tray, which is rotatably supported by the lid of the cup holder, has been known. This is illustrated, for example, in FIG. 3 of Japanese Unexamined Patent Publication No. 2003-48474 (patent document 1).

Access holders that are capable of sweeping out for collection of coins or the like, which may fall into the gap provided for housing the lid, by lifting the lid before closing, have also been known. This is illustrated, for example, in claim 1 of Japanese Unexamined-Utility Model Publication No. H06-32199 (patent document 2), claim 1 of Japanese Unexamined Patent Publication No. H11-189257 (patent document 3), and in paragraph 0017 of Japanese Patent No. 3475155 (patent document 4).

The aforementioned prior art trays, however, are manually rotated, and thus had a first problem in that their operation was made cumbersome. The aforementioned prior art trays, moreover, had a second problem of possibly coming in contact with the interior of the holder body or generating noise due to the vibration of a running vehicle. In addition, the aforementioned coin sweeping mechanism had a third problem in that the coin removal process was cumbersome or their structure was overly complex.

The purpose of the present invention is to overcome the aforementioned first through third problems of the conventional technology discussed above.

A first object of the invention is to overcome the foregoing first and second problems with the aforementioned prior art technology, and to provide an accessory holder with simple tray operation which is capable of preventing the generation of noise.

A second object of the invention is to provide an accessory holder with a simple separator operation where a separator is used in lieu of a tray that is expected to be accompanied by similar problems, and that is capable of preventing the generation of noise.

A third object of the invention is to overcome the third problem associated with the prior art technology described above, and to provide an accessory holder with a simple coin removal operation by allowing the coin to fall within the holder body without sweeping it out, while simplifying the device configuration.

A fourth object of the invention is to provide, in addition to the third object of the invention, a device capable of guiding a coin or any other fallen object into the holder body by utilizing a slanted surface.

A fifth object of the invention is to provide, in addition to the fourth object of the invention, a simplified separator operation, and to prevent the generation of noise.

A sixth object of the invention is to provide, in addition to the fifth object of the invention, a system that makes coin removal easy, while simplifying the structure.

Each of the embodiments of the present invention is proposed herein in order to achieve the respective objectives discussed above, and will be explained below with reference to the drawings.

SUMMARY OF THE INVENTION

Preferred embodiments of the present invention are explained while referring to the figures. The parenthetical reference numerals represent the reference numerals used in the embodiments, and do not limit the technical scope of the present invention. The drawing numbers represent the numbers used in the embodiments of the present invention, and do not limit the technical scope of the present invention, either.

Beginning with the first embodiment, this embodiment has the following characteristics. First, the accessory holder (cup holder 10), as exemplarily shown in FIGS. 1-6, includes the following features. A holder body 20, as exemplarily shown in FIGS. 1 and 17, is tubular in shape and has an opening at the top, and a bottom (22) upon which a small article (cups C1, C2) inserted through the opening (21) can be rested. A tray (40), as exemplarily shown in FIGS. 15-16, is foldable and rotatably supported at the mid height of the holder body (20). It rotates from the vertically folded position towards the horizontal bottom-raising position to hold a small article (cups C1, C2).

Secondly, the following features are included between the tray (40) and the holder body (20), as shown, for example, in FIGS. 15-16. A biasing means (tray spring 120) is provided to bias the tray (40) from the bottom-raising position towards the folded position. A damping means (tray rotary damper 130) is provided to dampen the rotational force of the tray (40) that is rotated by the bias force of the biasing means (tray spring 120). A locking means (tray locking device 140) is provided to lock the tray (40) in the folded position against the bias force of the biasing means (tray spring 120), and is unlockable (by a push button operation) The unlocking of the locking means (tray locking device 140), however, is not limited to the push button operation, and may be achieved by a slide lever operation, a push-in operation of the tray (40) itself, or the like.

A second embodiment of the present invention may be characterized as follows. First, the accessory holder (cup holder 10), as exemplarily shown in FIGS. 1-6, has the following features. The holder body (20), as exemplarily shown in FIGS. 1 and 17, is tubular in shape and has an opening at the top, and a bottom (22) upon which a small article (cups C1, C2) inserted through the opening (21) can be rested. The lid (30), as exemplarily shown in FIGS. 14-15, is rotatably supported by the holder body (20), and is provided for opening or closing the opening (21) of the holder body (20).

Secondly, the lid (30) includes the following. A separator (50), as exemplarily shown in FIGS. 5-6, is foldable and rotatably supported at the inner surface of the lid (30). It rotates from the retracted position in parallel with the lid (30) towards the horizontally projecting position to divide the interior of the holder body (20) into plural sections (two sections, for example).

Thirdly, the following features are included between the separator (50) and the lid (30), as exemplarily shown in FIGS. 15-17. A biasing means (spring in damper shaft 51) is provided to bias the separator (50) from the retracted position towards the projecting position. A damping means (damper shaft 51) is provided for damping the rotational force of the separator (50), which is rotated by the bias force of the biasing means (spring in the damper shaft 51). A locking means (separator locking device 160) is provided for locking the separator (50) in the retracted position against the bias force of the biasing means (spring in the damper shaft 51), and is unlockable (by a slide lever operation). The unlocking of the locking means (separator locking device 160), however, is not limited to the slide lever operation, and may be achieved by a push button operation, a push-in operation of the separator (50) itself, or the like.

The third embodiment of the present invention has the following characteristics. First, the accessory holder (cup holder 10), as exemplarily shown in FIGS. 1-6, includes the following features. The holder body (20), as exemplarily shown in FIGS. 1 and 17, is tubular in shape and has an opening at the top, and a bottom (22) upon which a small article (cups C1, C2) inserted through the opening (21) can be rested. The lid (30), as exemplarily shown in FIGS. 14-15, is rotatably supported by the holder body (20), and is used for opening the top of the holder body (20).

Secondly, the holder body (20), as exemplarily shown in FIGS. 18-20, is provided with the following features. A guide piece (60), as exemplarily shown in FIGS. 14-15, extends upwardly while maintaining a lid housing space (61) so as to house the lid (30). A dust access space (170), as exemplarily shown in FIGS. 18-20, runs through from the lid housing space (61) to the interior of the holder body (20) through which any fallen object (coin) that has fallen into the lid housing space (61) can pass.

The fourth embodiment of the present invention has the following characteristics, in addition to those of the third embodiment. Namely, a tilted surface (guide projection 171) for guiding a fallen object (coin) towards the dust access space (170) is created at the bottom of the lid housing space (61), as exemplarily shown in FIG. 18.

The fifth embodiment of the present invention has the following characteristics, in addition to those of the first embodiment. First, the accessory holder (cup holder 10), as exemplarily shown in FIGS. 1-6, includes the following features. A lid (30), as exemplarily shown in FIGS. 14-15, is rotatably supported by the holder body (20), and is used for opening the top of the holder body (20).

Secondly, the lid (30) includes the following. A separator (50), as exemplarily shown in FIGS. 5-6, is foldable and rotatably supported at the inner surface of the lid (30). It rotates from the retracted position in parallel with the lid (30) towards the horizontally projecting position to divide the interior of the holder body (20) into plural sections.

Thirdly, the following features are included between the separator (50) and the lid (30), as exemplarily shown in FIGS. 15-17. A biasing means (spring in damper shaft 51) is provided to bias the separator (50) from the retracted position towards the projecting position. A damping means (damper shaft 51) is provided to dampen the rotational force of the separator (50), which is rotated by the bias force of the biasing means (spring in the damper shaft 51). A locking means (separator locking device 160) is unlockable (slide lever operation) and used for locking the separator (50) against the bias force of the biasing means (spring in the damper shaft 51). The unlocking of the locking means (separator locking device 160), however, is not limited to the slide lever operation, and may be achieved by a push button operation, a push-in operation of the separator (50) itself, or the like.

The sixth embodiment of the present invention has the following characteristics, in addition to those of the first embodiment. First, the accessory holder (cup holder 10), as exemplarily shown in FIGS. 1-6 and FIGS. 18-20, includes the following features. A lid (30), as exemplarily shown in FIGS. 14-15, is rotatably supported by the holder body (20), and is used for opening the top of the holder body (20).

Secondly, the holder body (20) is provided with the following features. A guide piece (60), as exemplarily shown in FIGS. 14-15, extends upwardly while maintaining a lid housing space (61) so as to house the lid (30). A dust access space (170), as exemplarily shown in FIGS. 18-20, runs through from the lid housing space (61) to the interior of the holder body (20) through which any fallen object (coin) that has fallen into the lid housing space (61) can pass.

The seventh embodiment of the present invention has the following characteristics, in addition to those of the second and fifth embodiments. Specifically, the holder body (20), as exemplarily shown in FIGS. 18-20, includes the following features. A guide piece (60), as exemplarily shown in FIGS. 14-15, extends upwardly while maintaining a lid housing space (61) so as to house the lid (30). A dust access space (170), as exemplarily shown in FIGS. 18-20, runs through from the lid housing space (61) to the interior of the holder body (20) through which any fallen object (coin) that has fallen into the lid housing space (61) can pass.

The foregoing embodiments of the present invention provide numerous features and functions. In the first embodiment, the operation of the tray is simple, and the generation of noise is prevented.

In the second embodiment, although the same problems are anticipated even when the tray is replaced by a separator, the operation of the separator is simple, and the generation of noise is prevented.

In the third embodiment, coin removal is simplified by letting the coin fall within the holder body without sweeping it out, while simplifying the configuration.

In the fourth embodiment, in addition to what is offered by the third embodiment, a fallen object, such as a coin, can be guided into the holder body by utilizing a slanted surface.

In the fifth embodiment, in addition to what is offered by the first embodiment, the operation of the separator is simple, and the generation of noise is prevented.

In the sixth embodiment, in addition to what is offered by the first embodiment, coin removal is made easy, and the configuration is simplified.

In the seventh embodiment, in addition to what is offered by the second and fifth embodiments, both coin removal and the configuration are simplified.

DETAILED DESCRIPTION OF PREFERRED EMBODIMENTS

Figure 1:
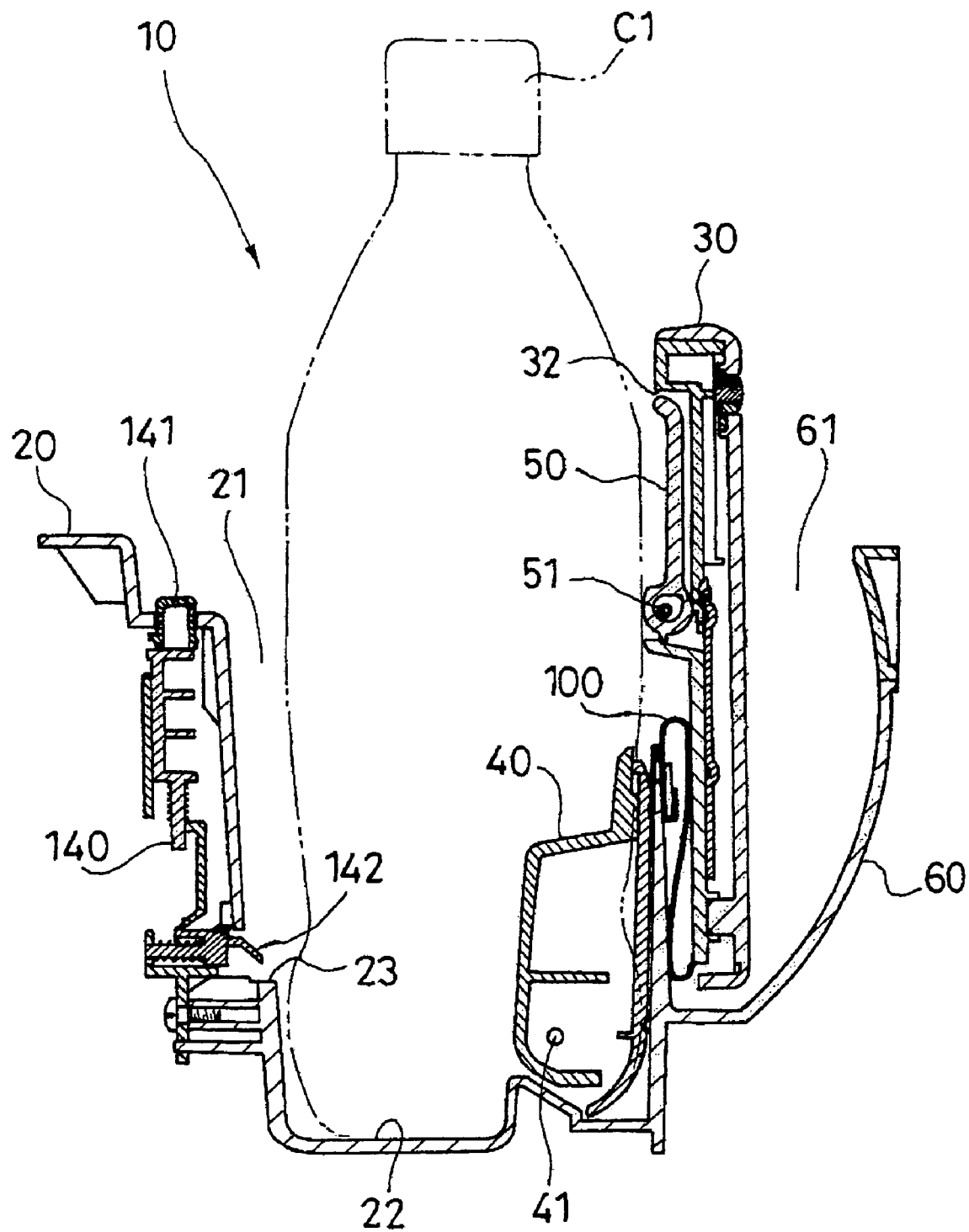
FIG. 1 is a sectional view of a cup holder.
Figure 2:
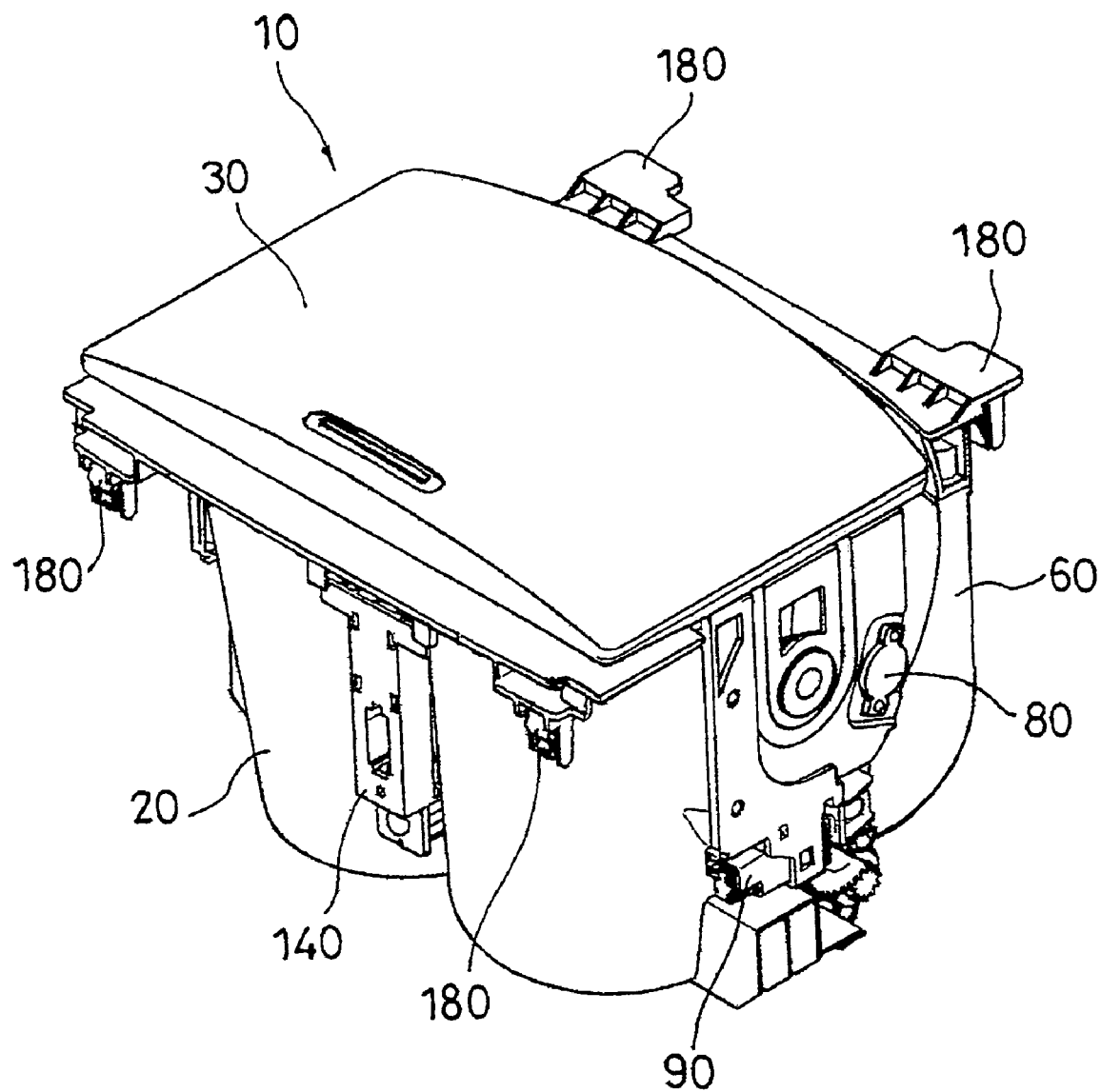
FIG. 2 is a perspective view of the cup holder when the lid is closed.
Figure 3:
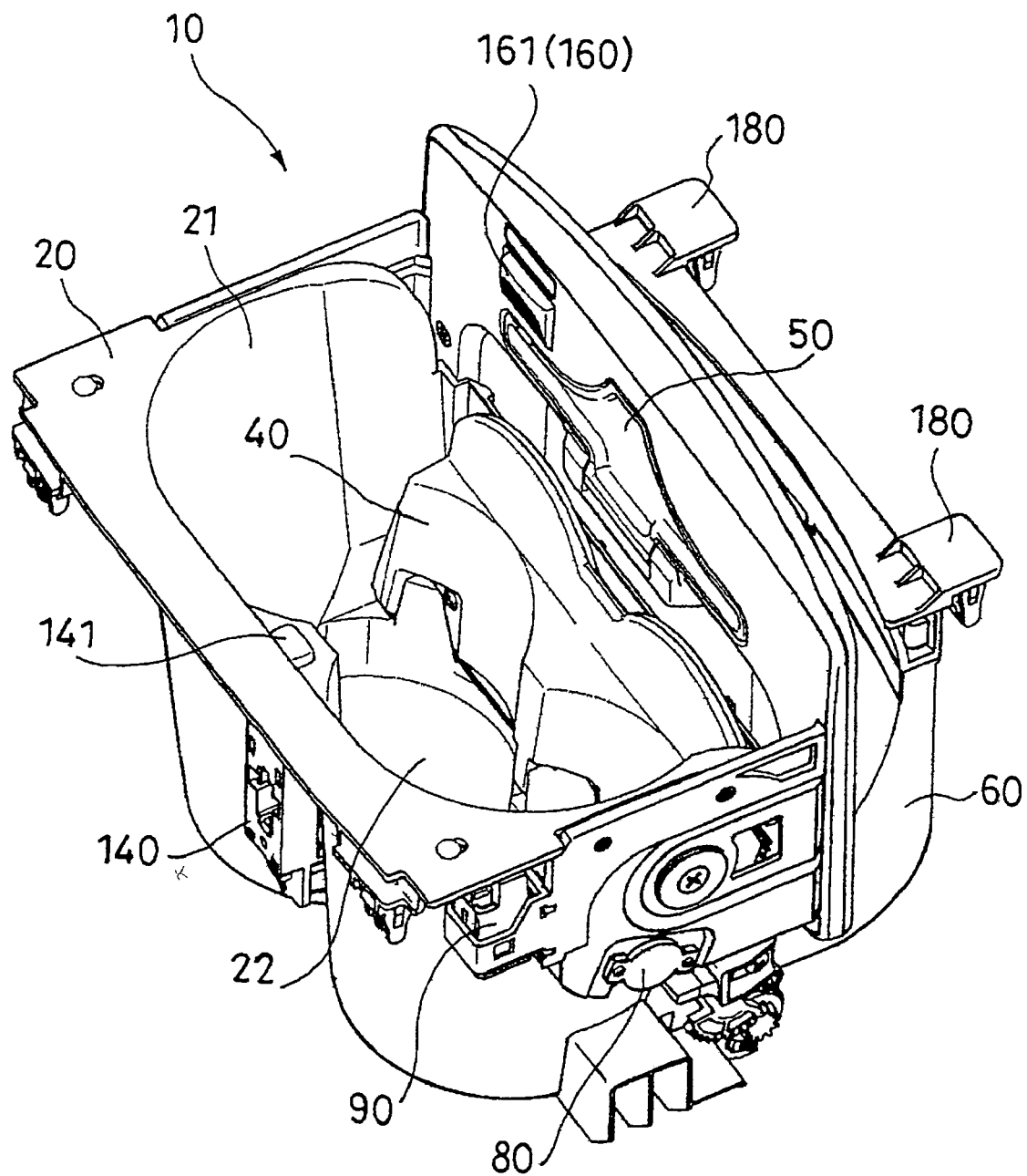
FIG. 3 is a perspective view of the cup holder when the lid is open.
Figure 4:
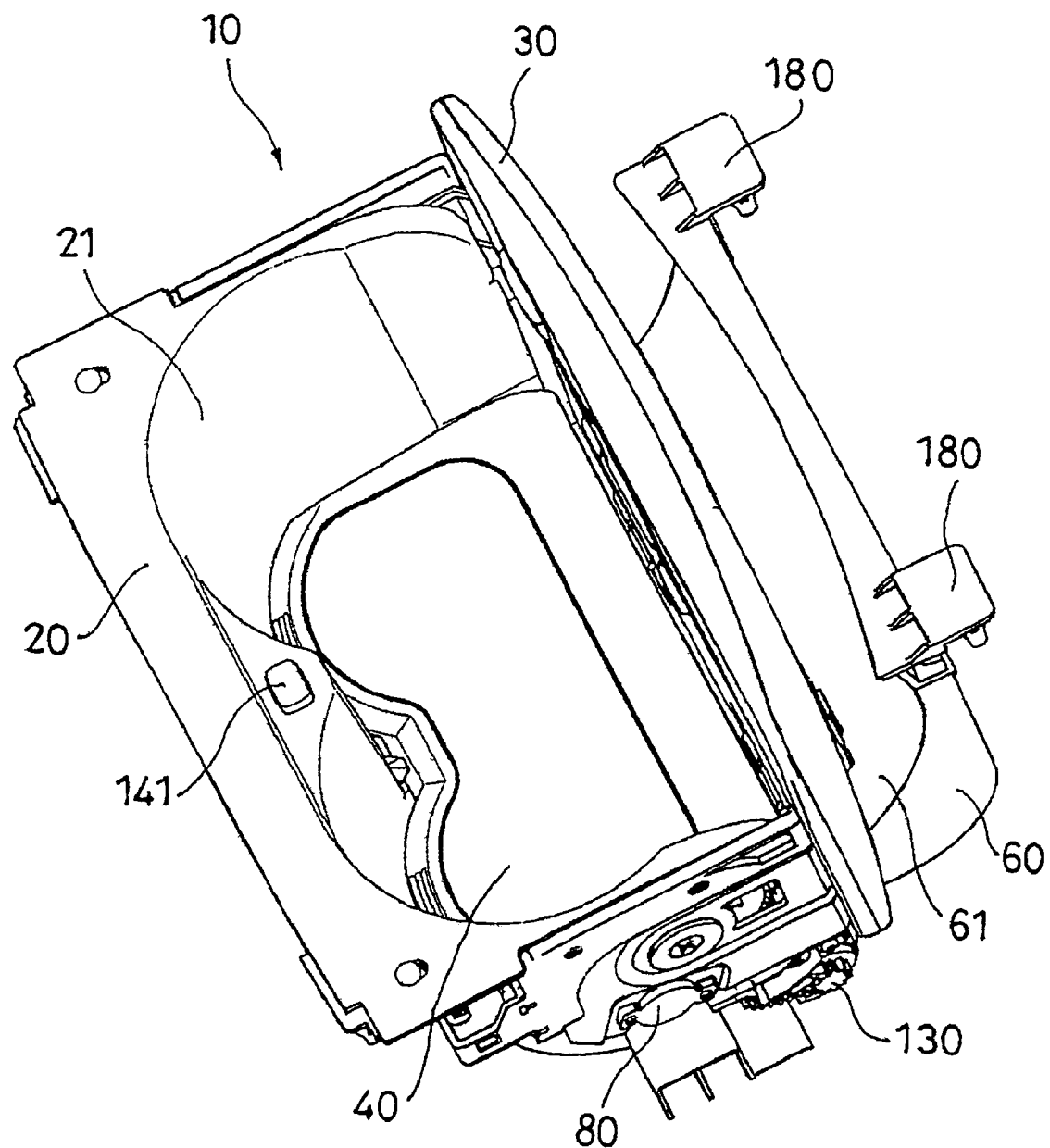
FIG. 4 is a perspective view of the cup holder when the tray is in a horizontally closed state.
Figure 5:
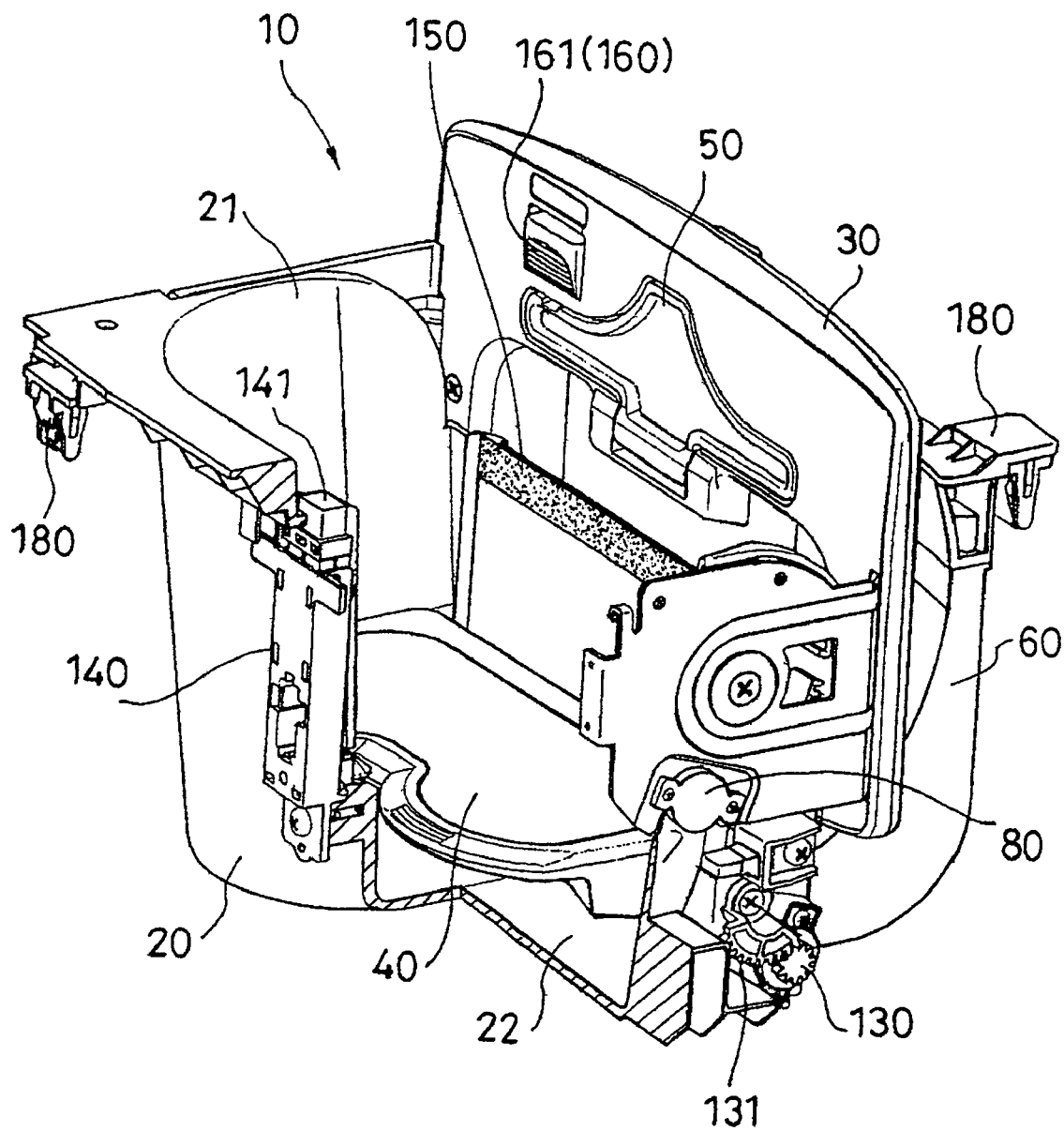
FIG. 5 is a partially cut-away perspective view of the cup holder when the tray is in a horizontally closed state.
Figure 6:
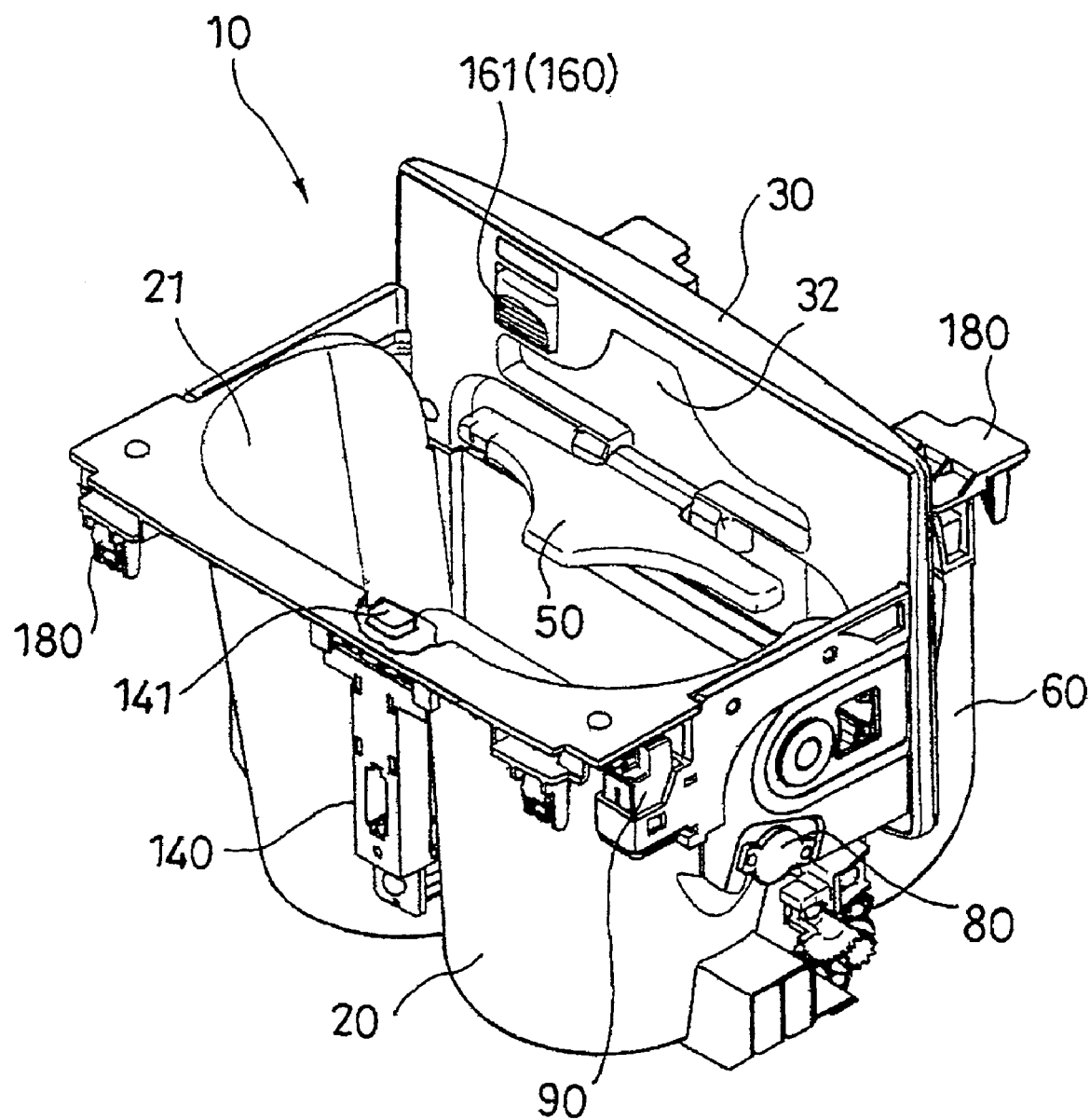
FIG. 6 is a perspective view of the cup holder when the separator is in a horizontally unfolded state.
Figure 7:
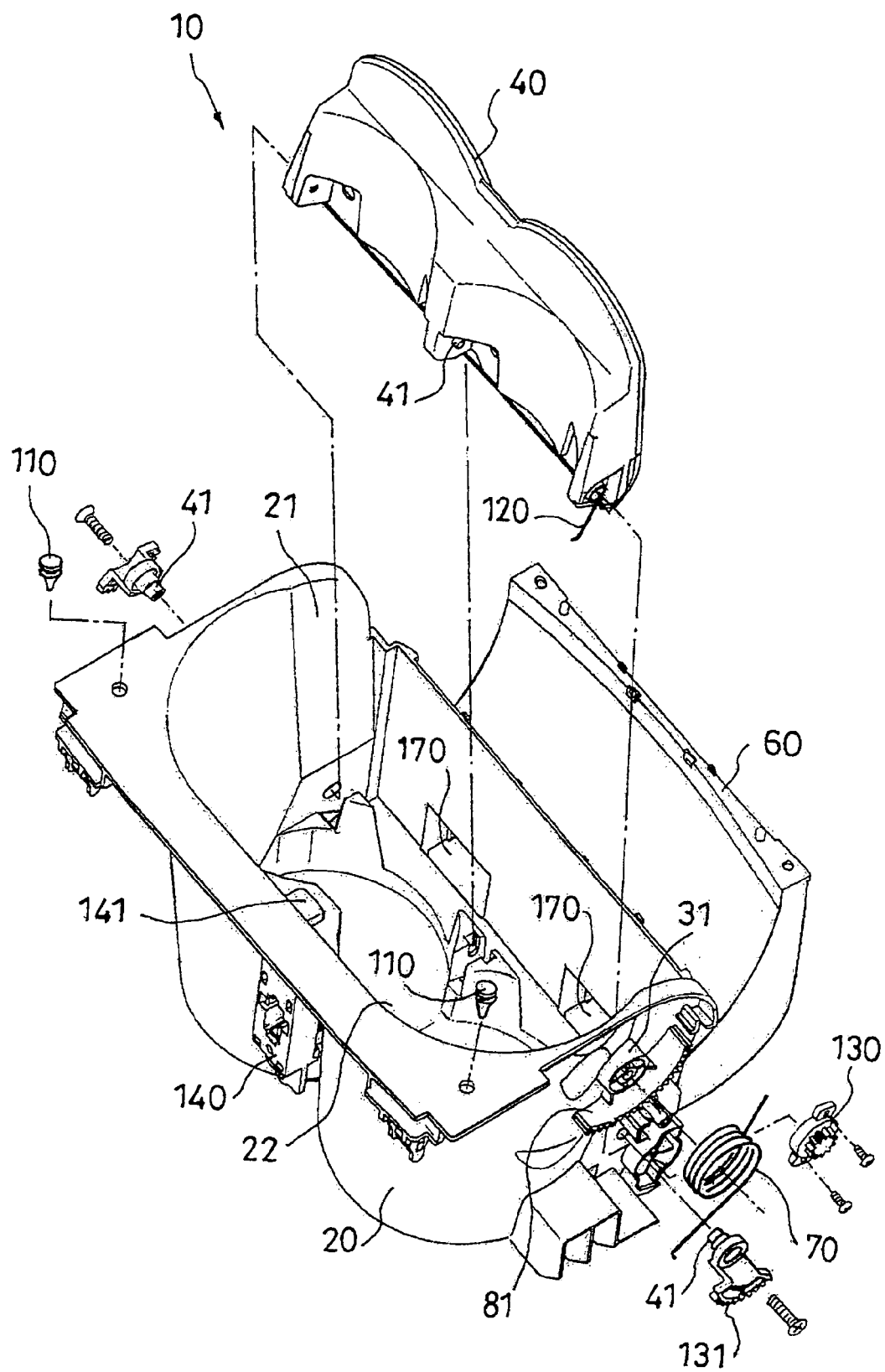
FIG. 7 is a partial perspective view of the cup holder.

With reference to the drawings, FIGS. 1-20 show one embodiment of the present invention. FIG. 1 is a sectional view of a cup holder. FIGS. 2-6 are various perspective views of the cup holder. FIG. 2 is a perspective view of the cup holder when the lid is closed. FIG. 3 is a perspective view of the cup holder when the lid is open. FIG. 4 is a perspective view of the cup holder when the tray is in the horizontally closed state. FIG. 5 is a partially cut-away perspective view of the cup holder when the tray is in the horizontally closed state. FIG. 6 is a perspective view of the cup holder when the separator is in the horizontally opened state. FIG. 7 is a partial perspective view of the cup holder.

Figure 8:
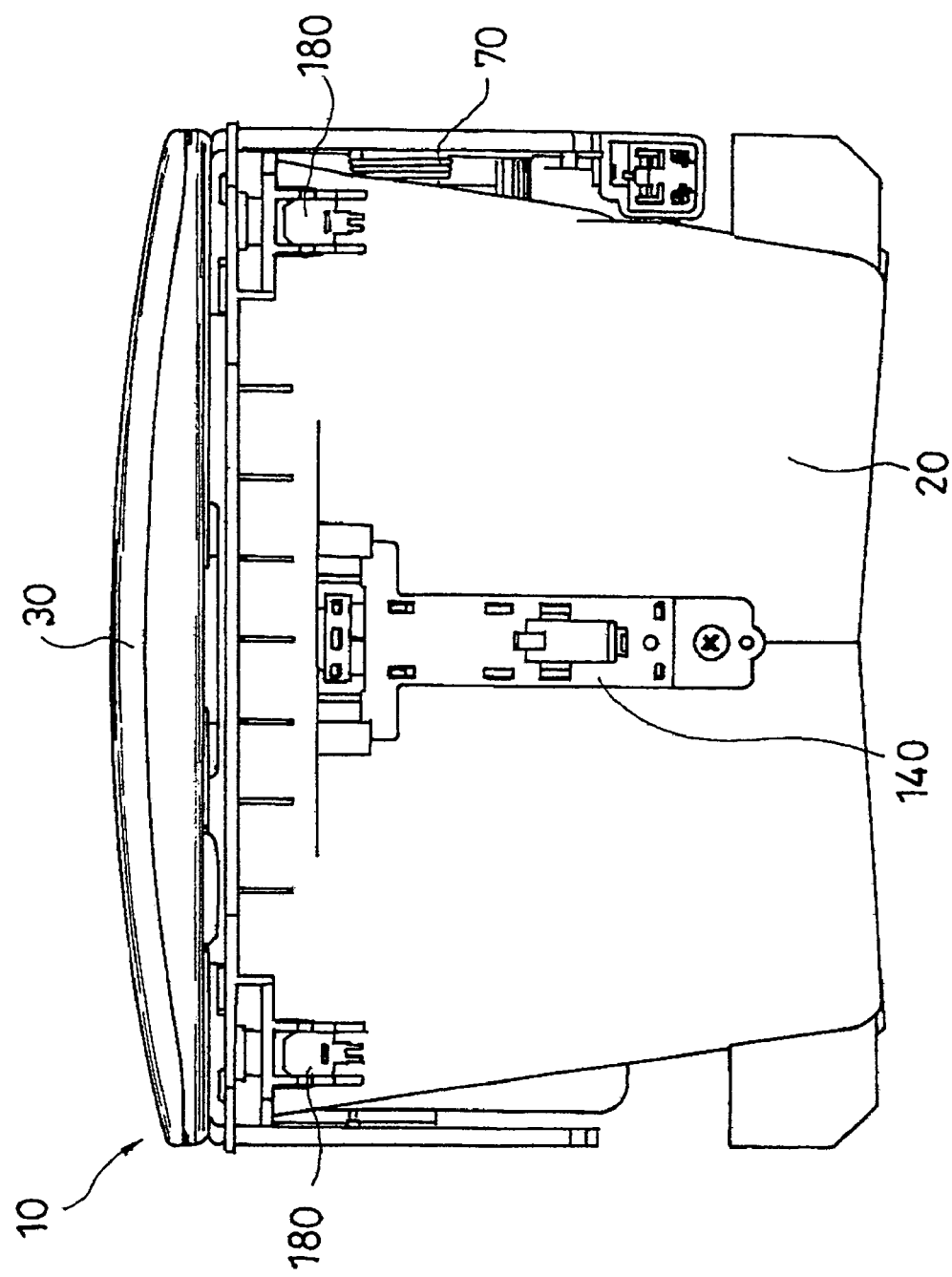
FIG. 8 is a front view of the cup holder.
Figure 9:
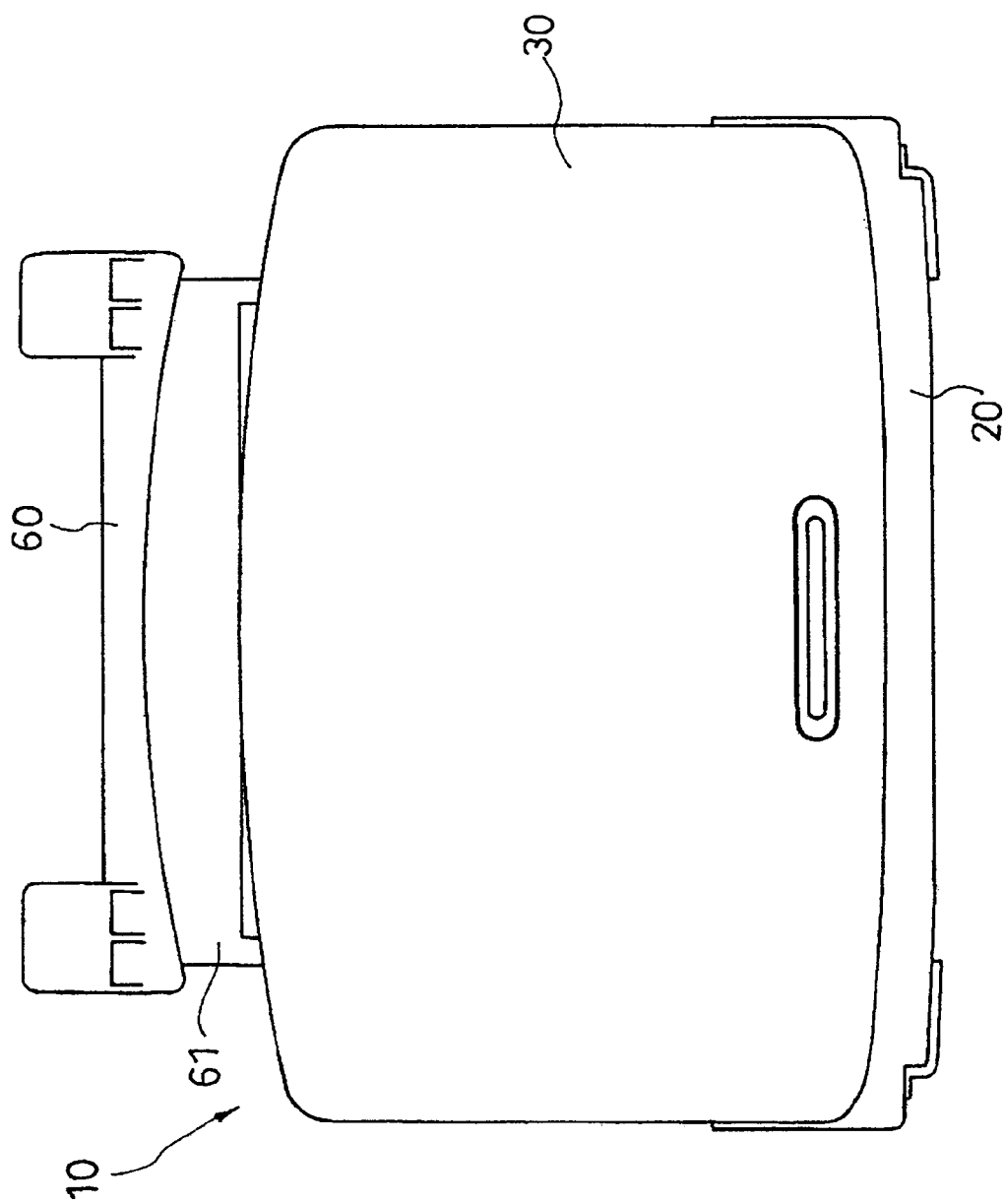
FIG. 9 is a top view of the cup holder.
Figure 10:
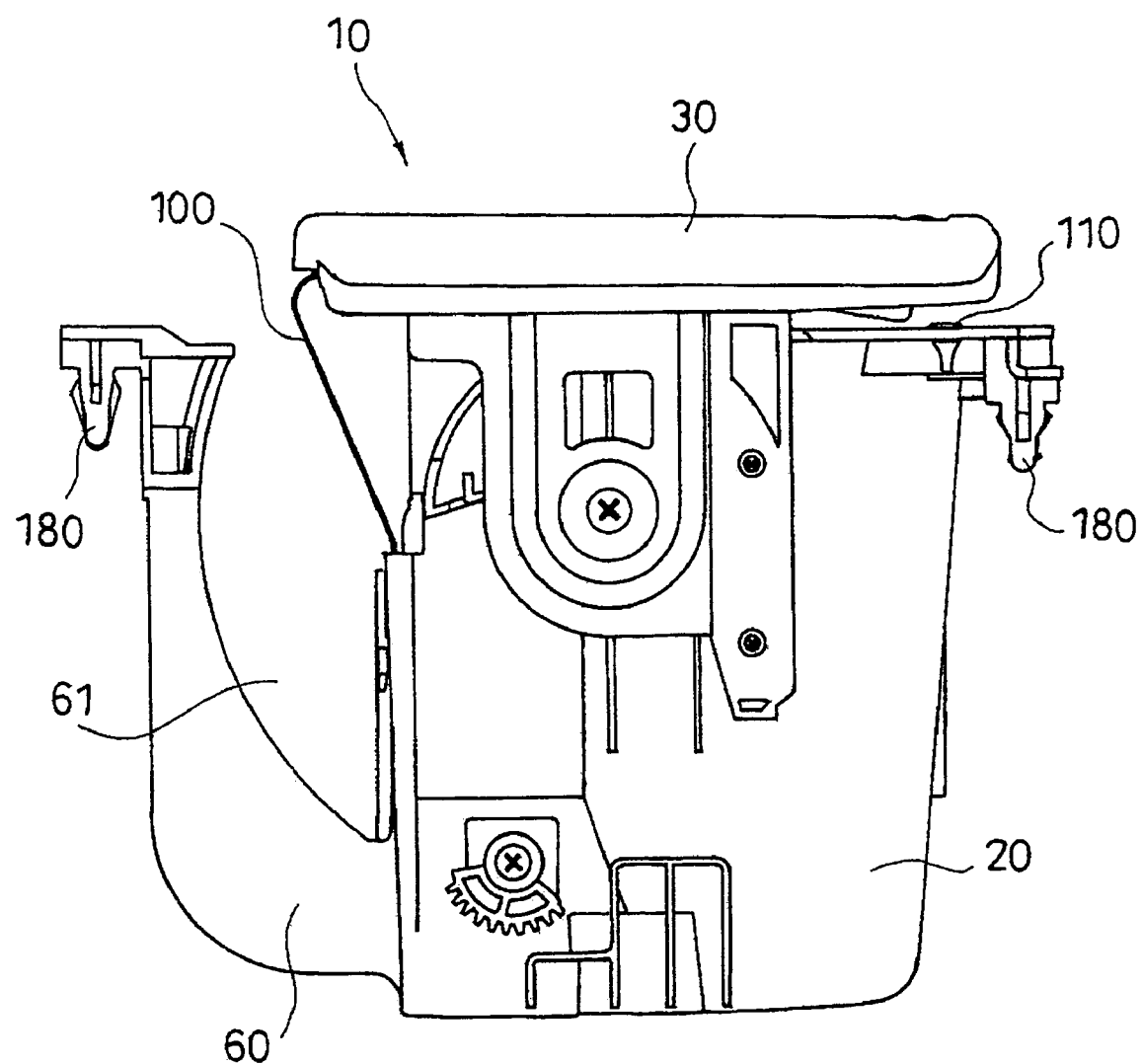
FIG. 10 is a left side view of the cup holder.
Figure 11:
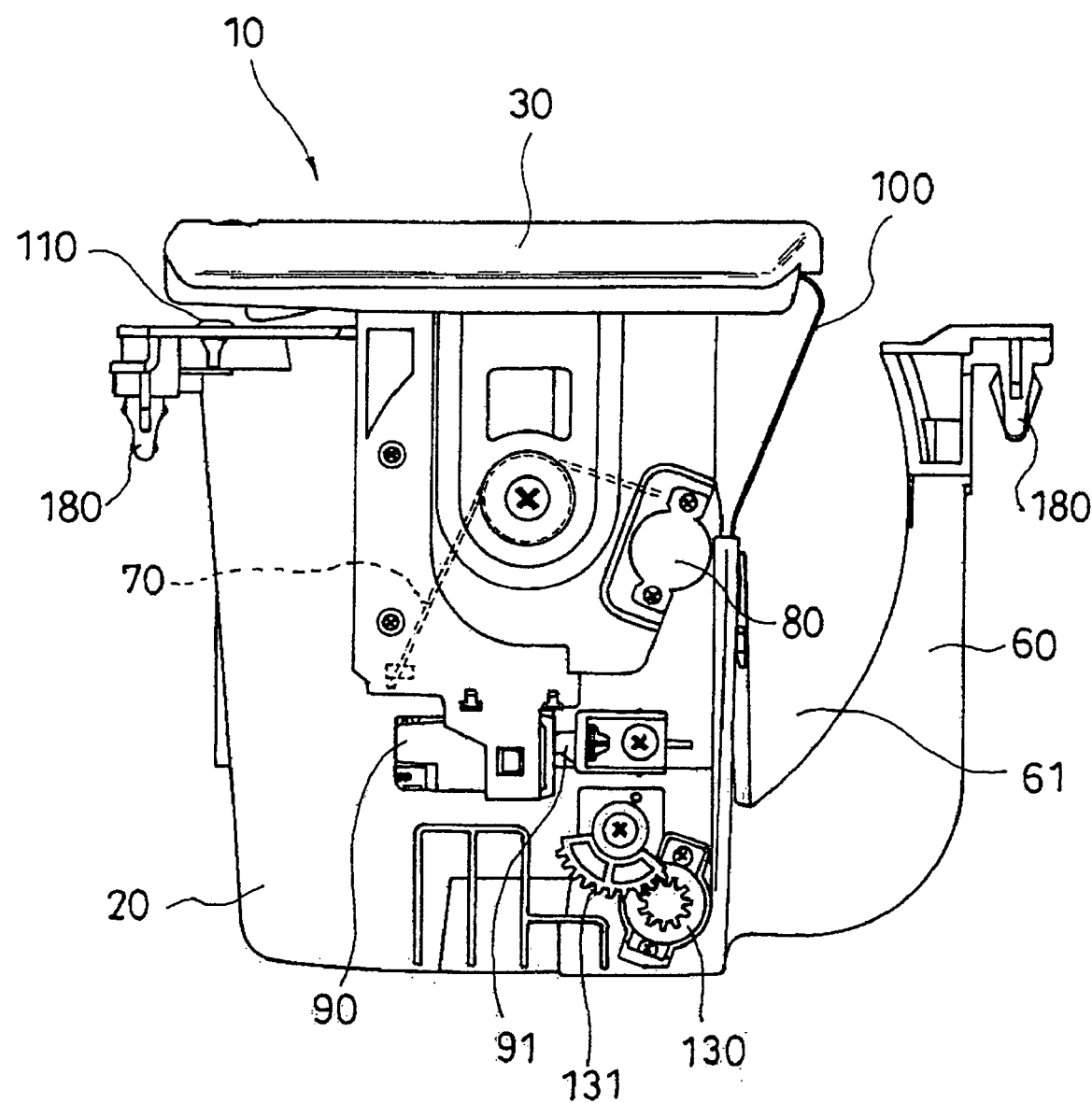
FIG. 11 is a right side view of the cup holder.
Figure 12:
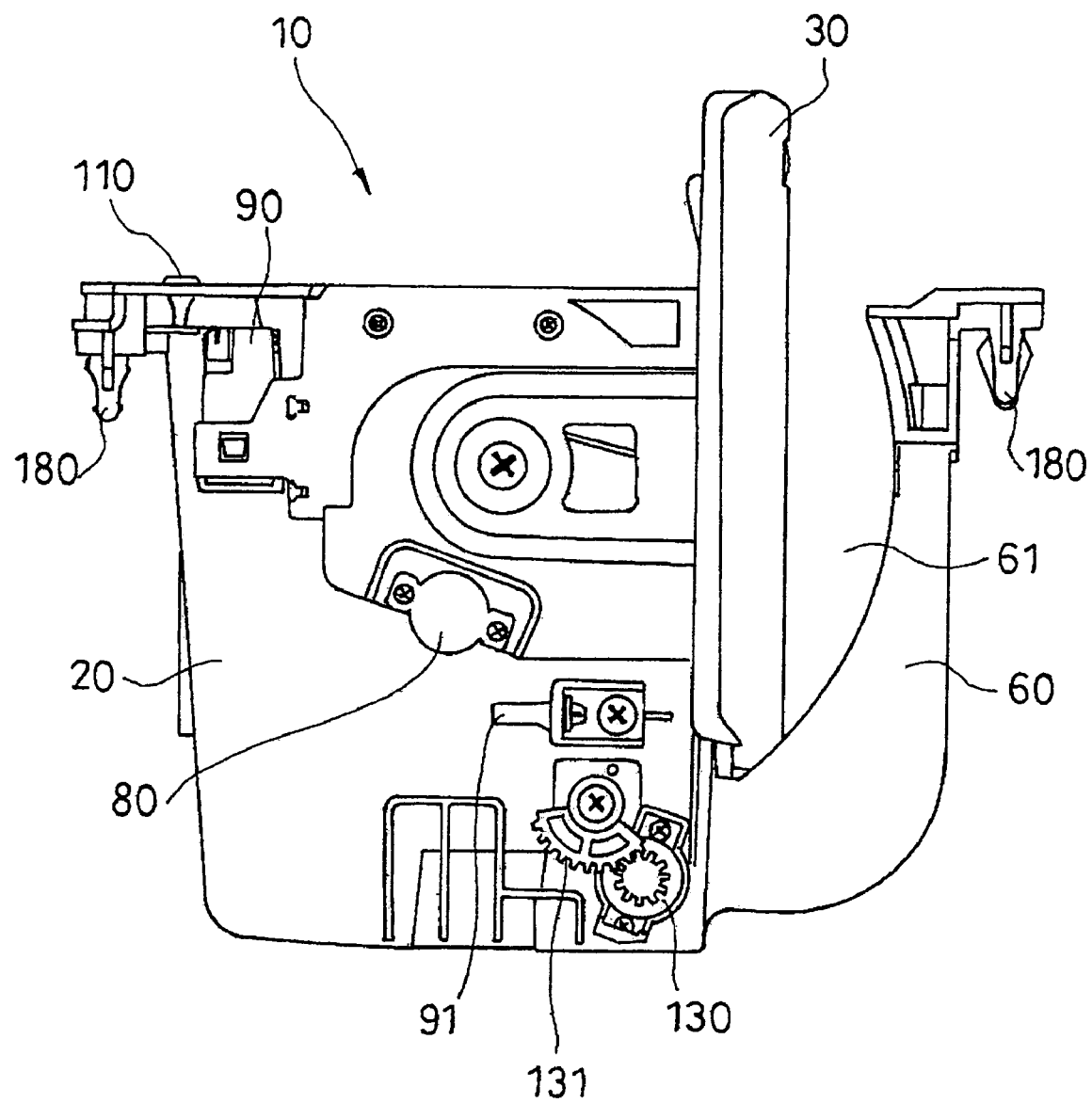
FIG. 12 is a right side view of the cup holder when the lid is open.

FIGS. 8-12 are various plan views of the cup holder. FIG. 8 is a front view. FIG. 9 is a top view. FIG. 10 is a left side view. FIG. 11 is a right side view. Finally, FIG. 12 is a right side view of the cup holder when the lid is open.

Figure 13:
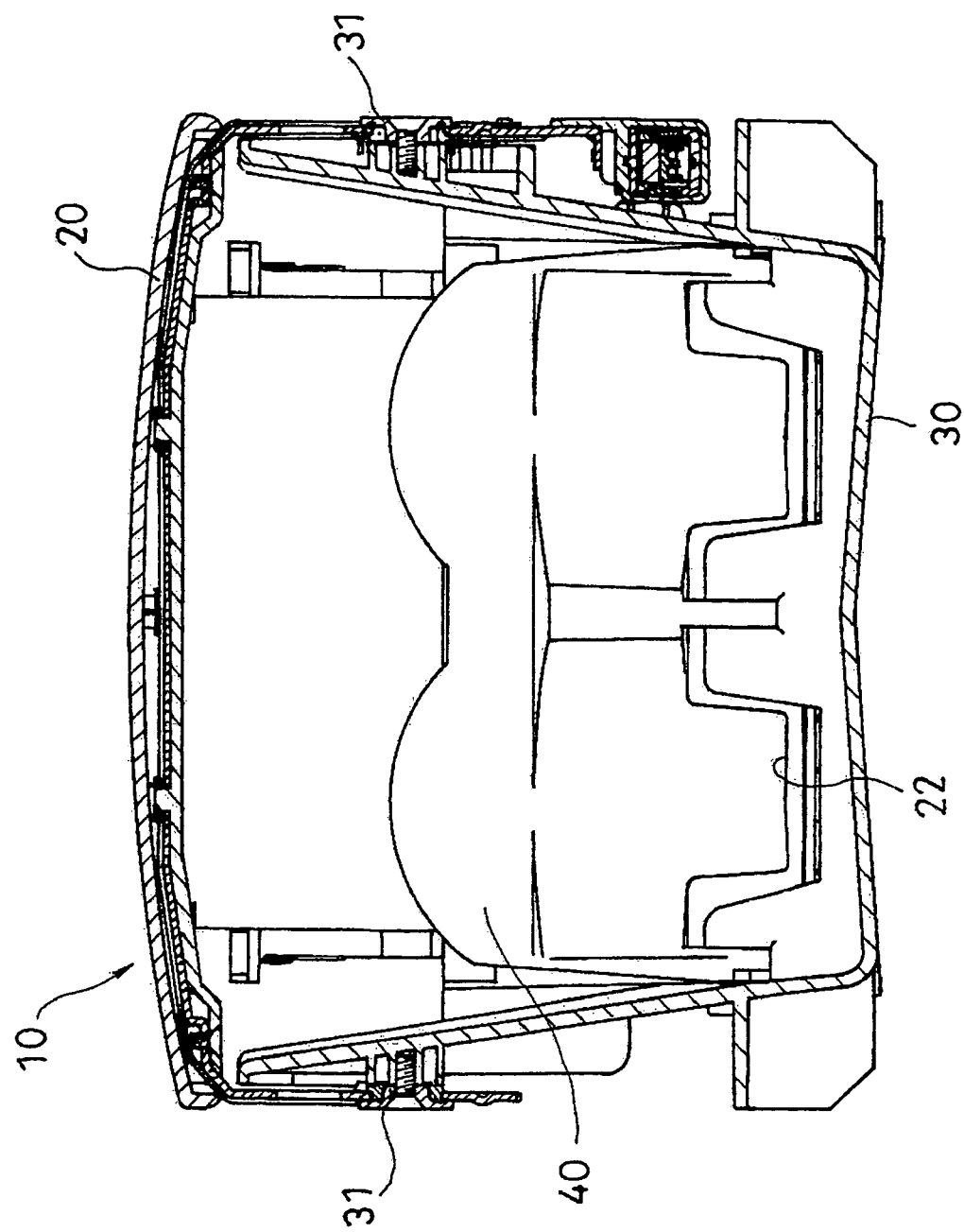
FIG. 13 is a sectional view of the cup holder when viewed from the front.
Figure 14:
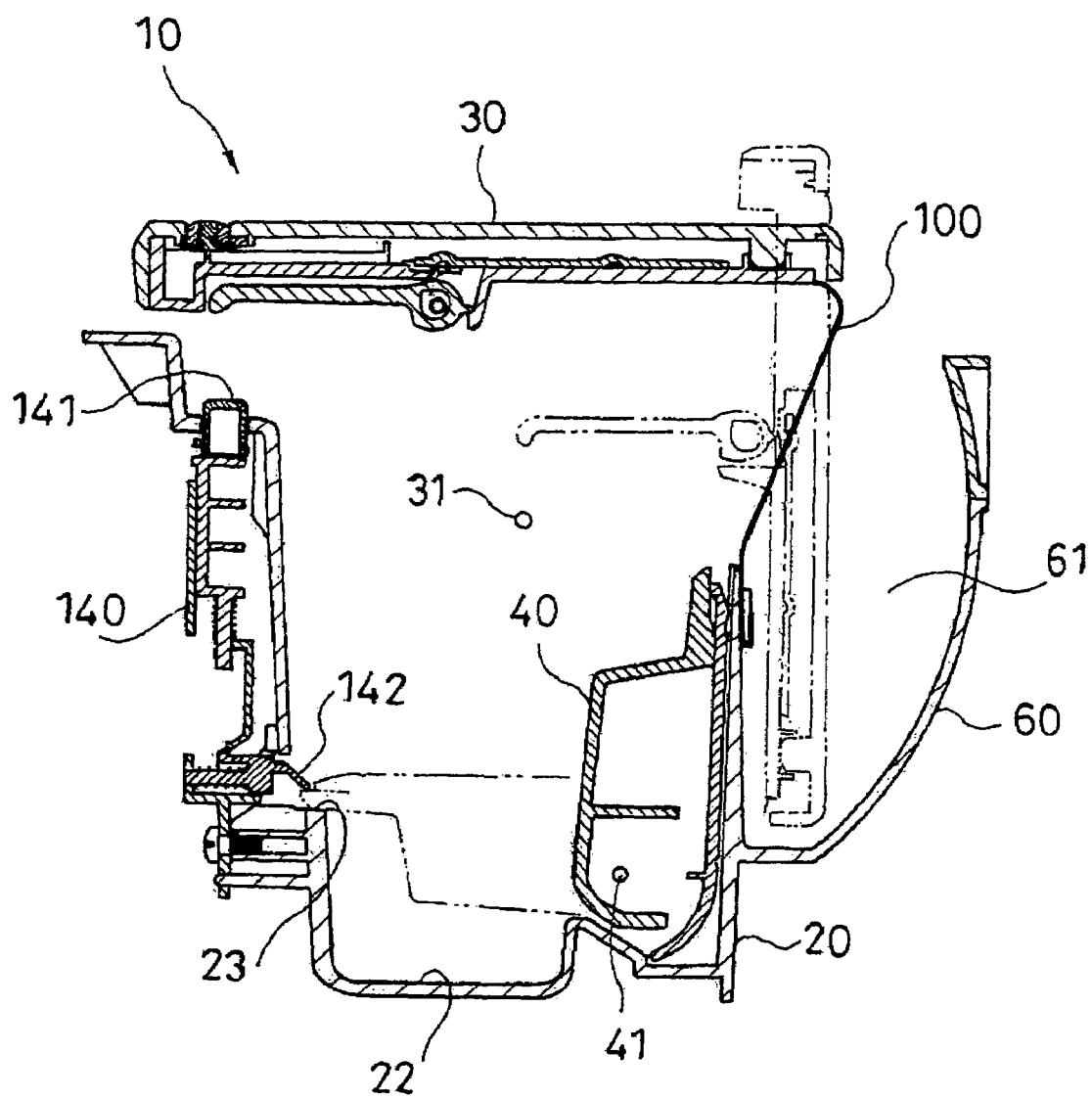
FIG. 14 is a sectional view of the cup holder when viewed from the right.
Figure 15:
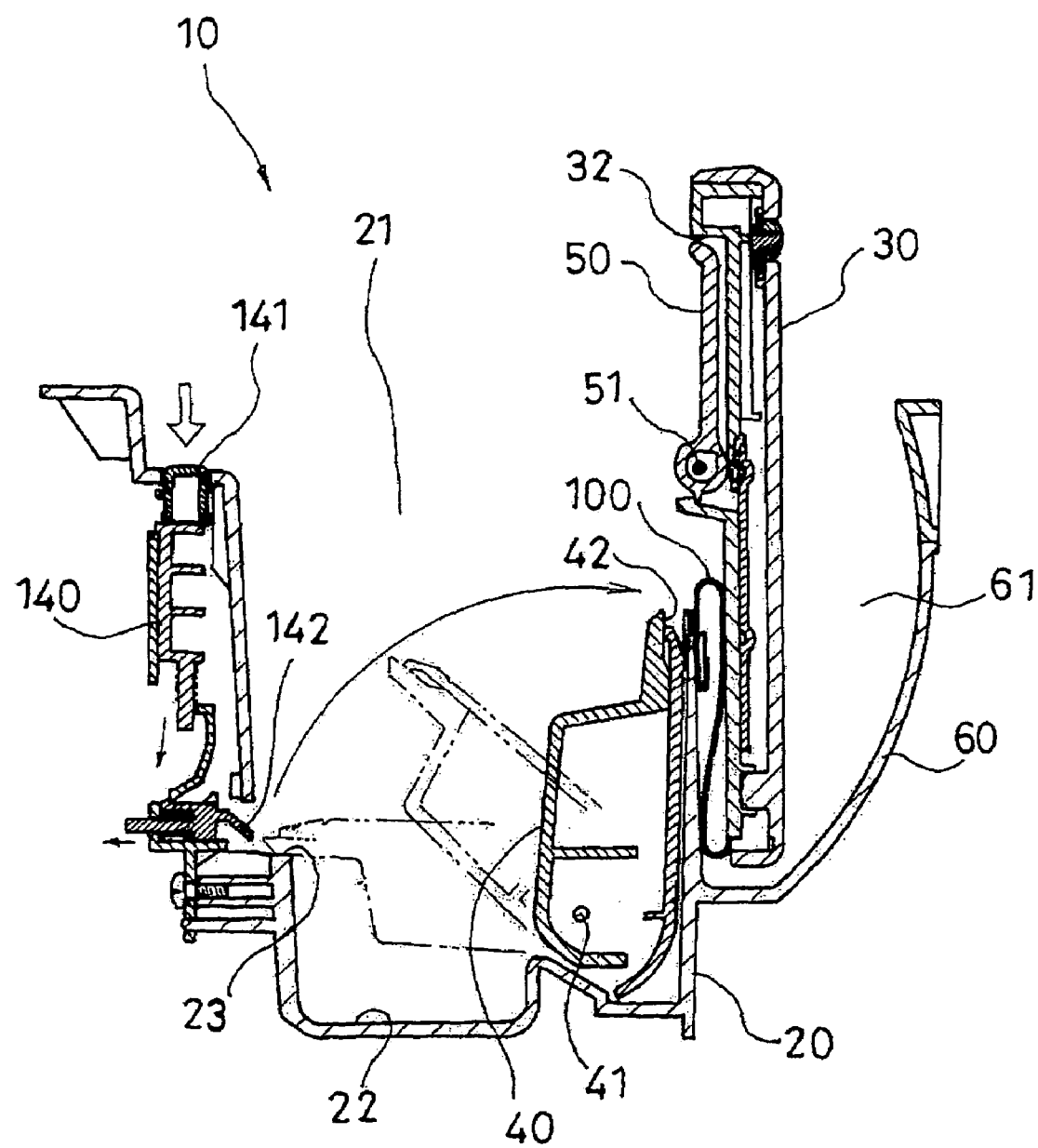
FIG. 15 is a sectional view of the cup holder as illustrated in FIG. 14, except that the lid is open.
Figure 16:
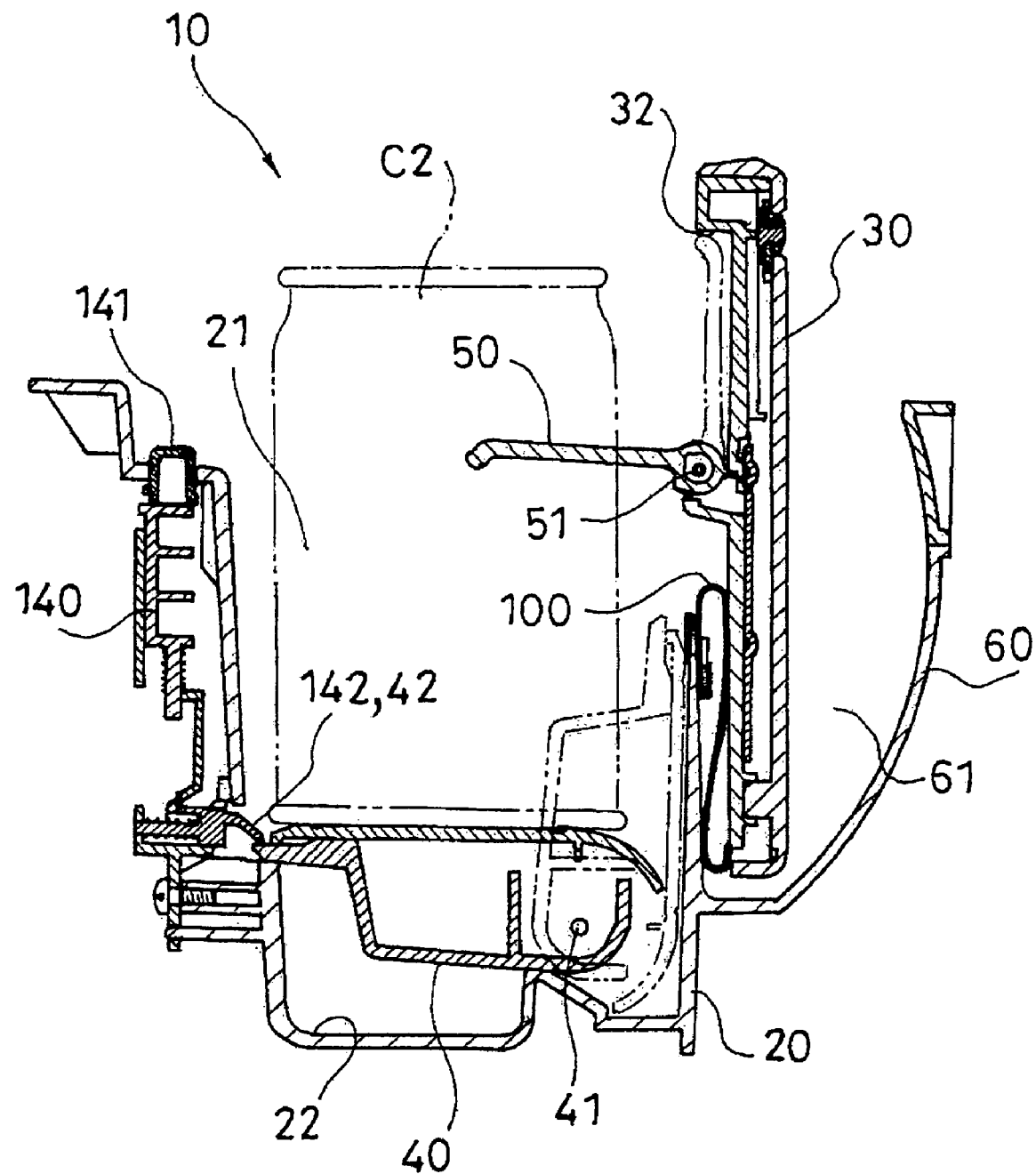
FIG. 16 is a sectional view of the cup holder as illustrated in FIG. 15, except that both the tray and the separator are in a horizontally closed state.
Figure 17:
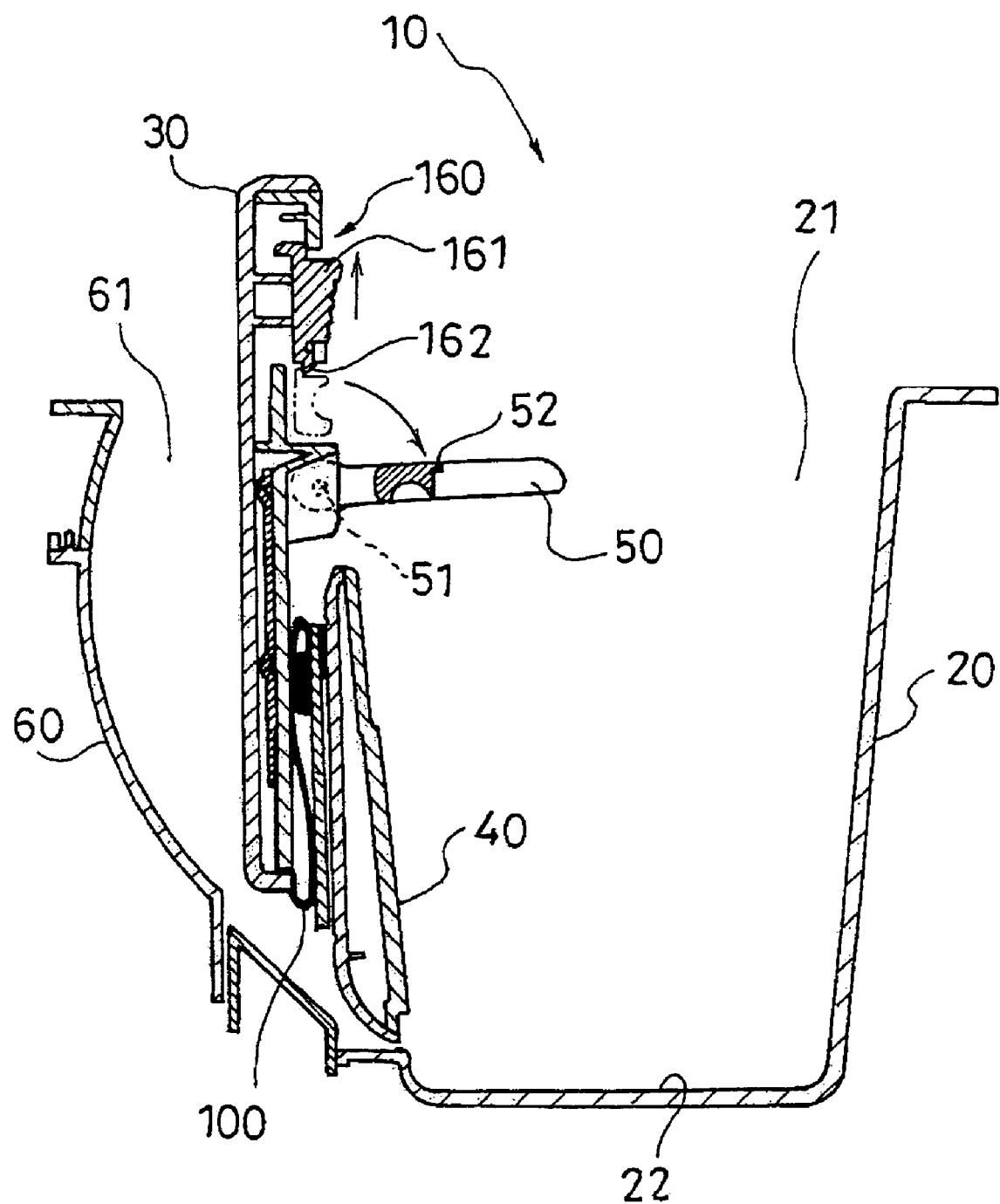
FIG. 17 is a sectional view of the cup holder when viewed from the left.
Figure 18:
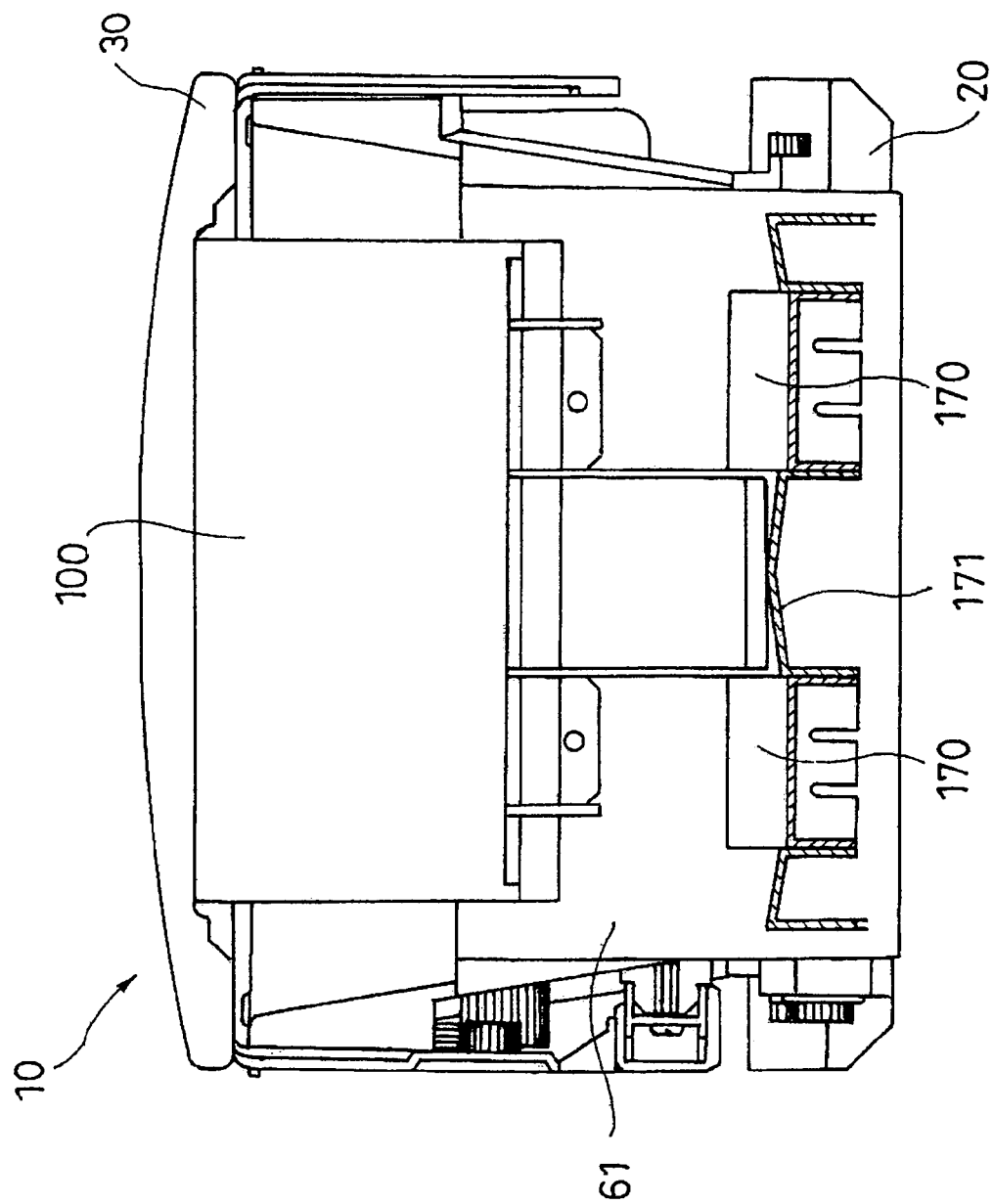
FIG. 18 is a sectional view of the cup holder when viewed from the rear.
Figure 19:
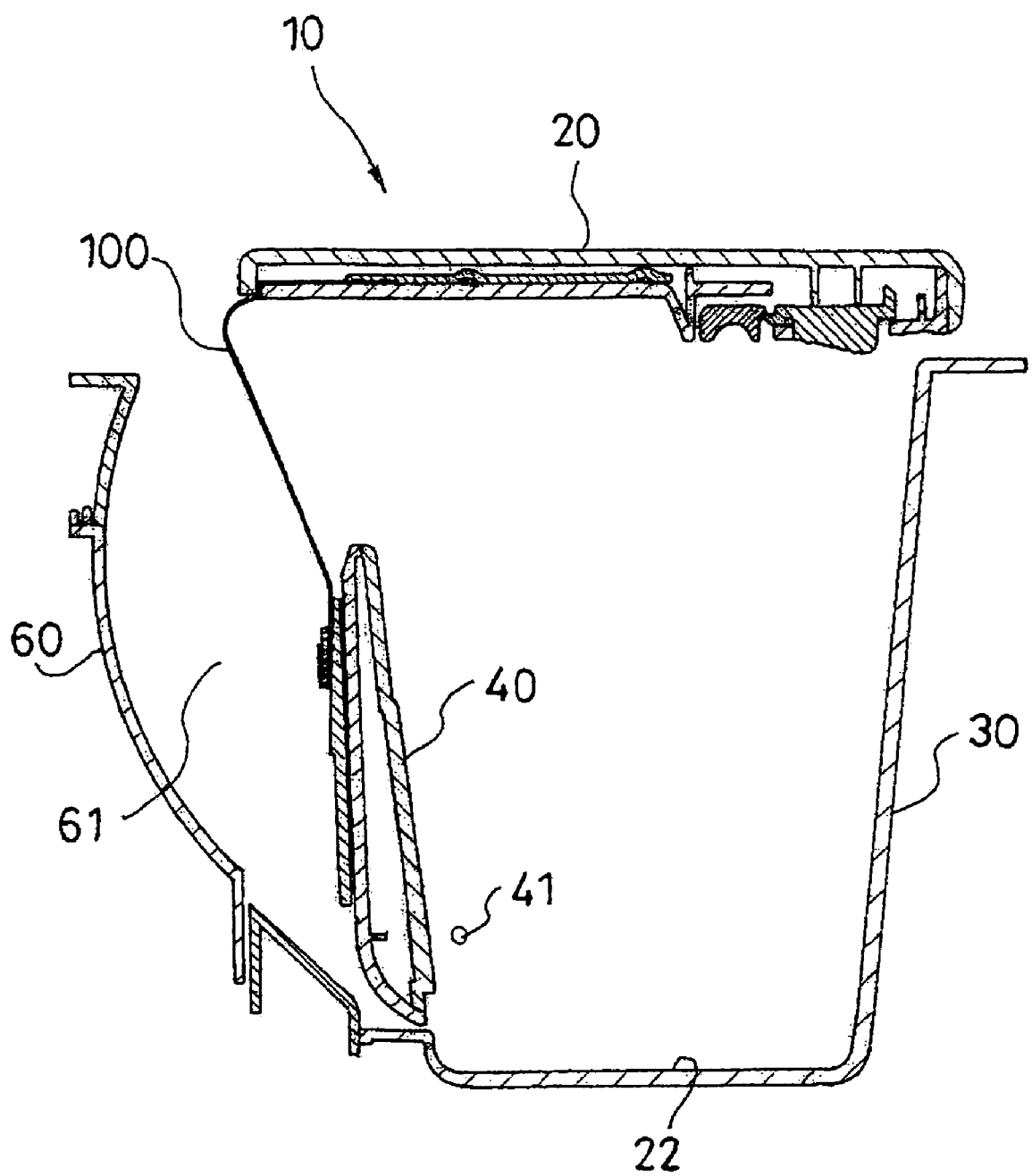
FIG. 19 is another sectional view of the cup holder when viewed from the right.
Figure 20:
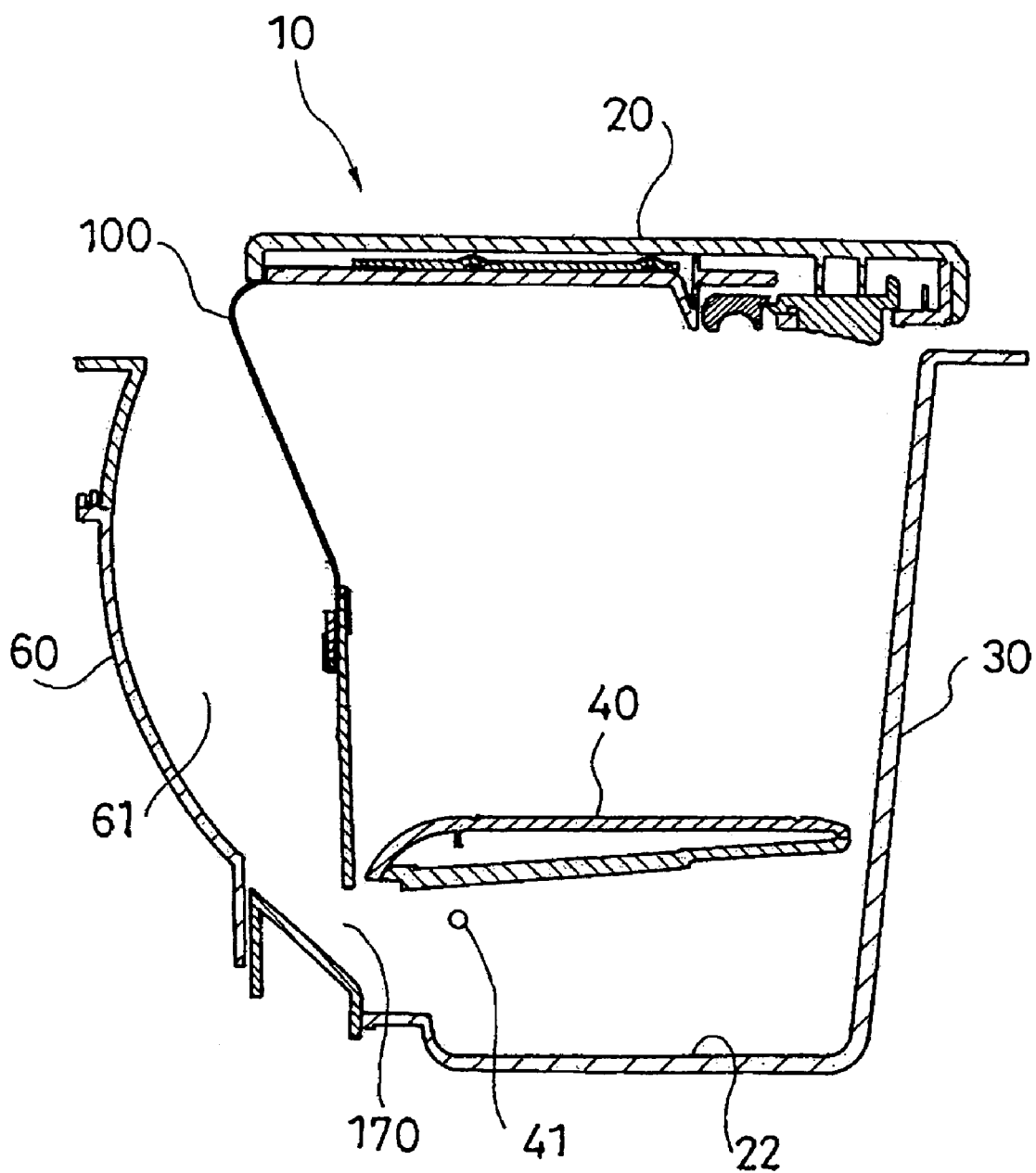
FIG. 20 is a sectional view of the cup holder as illustrated in FIG. 19, except that the tray is in a horizontally closed state with a dust access space open.

FIGS. 13-20 are various sectional views of the cup holder. FIG. 13 is a sectional view when the cup holder is viewed from the front. FIG. 14 is a sectional view when the cup holder is viewed from the right. FIG. 15 is a sectional view of the cup holder corresponding to FIG. 14 when the lid is open. FIG. 16 is a sectional view of the cup holder corresponding to FIG. 15 when the tray and separator are in the horizontally closed states. FIG. 17 is a sectional view when the cup holder is viewed from the left. FIG. 18 is a sectional view when the cup holder is viewed from the back. FIG. 19 is another sectional view when the cup holder is viewed from the right. Finally, FIG. 20 is a sectional view corresponding to FIG. 19 when the tray is in the horizontally closed state with the dust access space open. In the figures, reference numeral 10 represents a cup holder as an exemplary accessory holder, and the cup holder 10 is installed, for example, in the center console of a vehicle (not shown in the figures).

Although the cup holder is given as an exemplary accessory holder, it is not limited to that, and may be a coin case, card case, or the like. Although the center console of a vehicle is given as an exemplary installation location for the cup holder 10, it is not limited to that, and may be an arm rest, rear storage box, or the like. Although a vehicle is given as an exemplary location for the cup holder 10, it is not limited to that, either, and the accessory holder may be used in an aircraft, train, ship, furniture, kitchen cabinet, office equipment, or the like.

As shown in FIGS. 2-7, the cup holder 10 has the following roughly divided parts:

(1) Holder body 20,
(2) Lid 30,
(3) Tray 40 and
(4) Separator 50.

The parts for the cup holder 10, however, are not limited to the foregoing.

As shown in FIGS. 1 and 17, the holder body 20 is tubular in shape, and has an opening at the top and a bottom 22 upon which a cup as an exemplary small article, or a relatively tall PETE bottle C1, for example, inserted from the opening 21, can be rested. In the interior, two such cups, or the PETE bottles C1, can be held on the right and left sides. The cup, however, is not limited to the PETE bottle C1 shown in FIG. 1 or the can C2 shown in FIG. 17, and may be other types of cups, glasses, thermoses, or the like.

A guide piece 60 with a J-shaped section is disposed to extend upwardly from the lower end portion of the holder body 20, as shown in FIGS. 14-15. The section of the guide piece 60, however, is not limited to a J-shape, and it may be L-shaped. As shown in FIGS. 14-15, the guide piece 60 opposes the back wall of the holder body 20 while maintaining a lid housing space 61 for housing the lid 30 between the holder body 20 and itself.

As shown in FIGS. 14-15, the lid 30 is rotatably supported by the holder body 20 via a lid shaft 31, and is provided to open or close the opening 21 of the holder body 20. The parts listed below are included between the lid 30 and the holder body 20, as shown in FIGS. 7 and 11-12.

(1) Lid spring 70 (lid biasing means)
(2) Lid rotary damper 80 (lid damping means)
(3) Latching device 90 (lid locking means)
(4) Sheet cover 100
(5) Elastic material 110

The parts included between the lid 30 and the holder body 20, however, are not limited to the above (1)-(5).

The lid spring 70 constitutes a biasing means (lid biasing means), and is provided to bias the lid 30 towards the opened position. Although a spring is used for the lid spring 70, it is not limited to that, and may be a leaf spring, power spring, or the like.

The lid rotary damper 80 constitutes a damping means (lid damping means), and is provided to dampen the rotational force of the lid 30 that is rotated by the restoring force of the lid spring 70. More specifically, as the lid rotary damper 80, an oil damper, for example, is used. As shown in FIGS. 11-12, the lid rotary damper 80 is secured to the lid 30, and rotates integrally with the lid 30.

As shown in FIG. 7, a lid gear 81, arced around the lid shaft 31, is provided on the outer surface of the holder body 20 to engage with the gear of the lid rotary damper 80. When the lid 30 rotates about the lid shaft 31, therefore, the gear of the lid rotary damper 80 also rotates by means of the engagement with the lid gear 81, during which action a damping force is applied.

Although an oil rotary damper is used as the lid rotary damper 80, it is not limited to that, and may be a piston-cylinder type damper utilizing oil or air.

The latching device 90 constitutes a locking means (lid locking means), and, as shown in FIGS. 11-12, it is secured to the lid 30 to rotate integrally with the lid 30. As shown in FIGS. 11-12, a striker 91 that engages with the latching device 90 is fixed to the outer surface of the holder body 20. When the lid 30 is closed, the latching device 90 locks with the striker 91 held therein, as shown in FIG. 11; pressing down the lid 30 further from this closed position terminates the locked state and releases the striker 91, as shown in FIG. 12.

As shown in FIGS. 14-15, the sheet cover 100 is secured between the base end of the lid 30 where the lid shaft 31 is located and the back wall of the holder body 20 to prevent dust from penetrating from the gap created between the closed lid 30 and the holder body 20 into the interior of the holder body 20.

As shown in FIG. 7, elastic materials 110 are disposed at both the left and right sides of the upper surface of the holder body 20 to flexibly abut against the inner surface of the lid 30 at the free end to thereby prevent the generation of noise.

As shown in FIGS. 7 and 15-16, the tray 40 is foldable and rotatably supported via the tray shaft 41 at mid height of the holder body 20. It rotates from the vertically folded position (see FIG. 15) towards the horizontal bottom-raising position (see FIG. 16) to thereby allow a cup as an exemplary small article, or a relatively short can C2, for example, to be rested thereon.

As shown in FIGS. 5, 7, and 15-16, the below listed parts are included between the tray 40 and the holder body 20:
(1) Tray spring 120 (tray biasing means)
(2) Tray rotary damper 130 (tray damping means)
(3) Tray locking device 140 (tray locking means), and
(4) Cushion sheet 150

The parts included between the tray 40 and the holder body 20, however, are not limited to the above (1)-(5).

The tray spring 120 constitutes a biasing means (tray biasing means), and is provided to bias the tray 40 from the bottom-raising position (see FIG. 16) towards the folded position (see FIG. 15).

Although a spring is used for the tray spring 120, it is not limited to that, and may be a leaf spring, power spring, or the like.

The tray rotary damper 130 constitutes a damping means (tray damping means), and is provided to dampen the rotational force of the tray 40 that is rotated by the restoring force of the tray spring 120. More specifically, as in the case of the lid rotary damper 80, an oil damper, for example, is used as the tray rotary damper 130. As shown in FIG. 7, the tray rotary damper 130 is secured to the outer surface of the holder body 20. As shown in FIG. 7, a tray gear 131 that rotates integrally with the tray 40 is secured to the tray 40 to engage with the gear of the tray rotary damper 130.

When the tray 40 rotates about the tray shaft 41, therefore, the gear of the tray rotary damper 130 also rotates by means of this engagement with the tray gear 131, during which action a damping force is applied. Although an oil rotary damper was used as the tray rotary damper 130, it is not limited to that, and may be a piston-cylinder type damper utilizing oil or air.

The tray locking device 140 constitutes a locking means (tray locking means) for locking the tray 40 in the folded position against the restoring force of the tray spring 120, and is unlockable. More specifically, the tray locking device 140, as shown in FIGS. 14-15, includes a push button 141 and a tray locking hook 142, which is usually projected but is retracted with a push-in operation of the push button 141.

As shown in FIGS. 15-16, the tray locking device 140 is secured to the inner side surface of the holder body 20. At this time, the tray locking hook 142 is positioned to face, with a space in between, the stepped section 23 that projects from the inner side surface of the holder body 20.

As shown in FIGS. 15-16, the tray 40 has a tray locking groove 42 at the free end section, into which the tray locking hook 14 is fitted. When the tray 40 rotates from the vertically folded position (see FIG. 15) to the horizontal bottom-raising position (see FIG. 16), the free end thereof pushes in the tray locking hook 142 once. When the tray 40 is further rotated, the lower surface of the free end abuts against the upper surface of the stepped section 23 of the holder body 20, and, at this time, the tray locking hook 142 regains its initial position to project again using the spring's restoring force, and, as shown in FIG. 16, fits into the tray locking groove 42 to thereby lock the tray 40 in the horizontal bottom-raising position.

To fold the tray 40, pushing in the push button 141, as shown in FIG. 15, is all that is required. Pressing the push button 141 retracts the tray locking hook 142 once. At this time, the tray 40 is unlocked, and rotated by the restoring force of the tray spring 120 towards the folded position.

As shown in FIG. 5, the cushion sheet 150 is secured to the inner side surface of the holder body 20 to elastically abut against the free end of the tray 40, thereby preventing the generation of noise.

As shown in FIGS. 15-16, the separator 50 is foldable and rotatably supported at the inner surface of the lid 30 via the damper shaft 51. Rotating it from the stored position in parallel with the lid 30 (see FIG. 15) to the horizontally projecting position (see FIG. 16) separates the interior of the holder body 20 into plural sections, into two sections on the left and right, for example.

A separator storing section 32, which is a recess deep enough to fit the separator 50, is provided in the inner surface of the lid 30. The separator 50, when stored within the separator storing section 32, maintains the inner surface of the lid 30 substantially flat.

As shown in FIGS. 15-17, the parts listed below are included between the separator 50 and the lid 30.
(1) Damper shaft 51 (separator biasing means, separator damping means)
(2) Separator locking device 160 (separator locking means)

The parts included between the separator 50 and the lid 30, however, are not limited to the above (1) and (2).

The damper shaft 51 functions as both a biasing means (separator biasing means) and a damping means (separator damping means), and includes a built-in separator spring and a separator rotary damper using oil, although these are not shown in the figures. In other words, the separator spring (not shown in the figures) constitutes the biasing means (separator biasing means) and is provided to bias the separator 50 from the stored position (see FIG. 15) towards the projecting position (see FIG. 16).

The separator rotary damper (not shown in the figures) constitutes the damping means (separator damping means) and is provided to dampen the rotational force of the separator 50 that is rotated by the restoring force of the separator spring (not shown).

Although the separator spring and separator rotary damper are built into the damper shaft 51, the configuration is not limited to that. The three parts of the separator 50, i.e., the separator shaft 51, separator spring, and separator rotary damper, may be separated and provided independently.

A spring, leaf spring, power spring, or the like may be used as the separator spring. An oil rotary damper, piston-cylinder damper utilizing oil or air, or the like may be used as the separator rotary damper.

The separator locking device 160 constitutes the locking means (separator locking means) for locking the separator 50 in the stored position against the restoring force of the separator spring (not shown), and is unlockable. More specifically, the separator locking device 160, as shown in FIG. 17, includes a slide lever 161 and a separator locking hook 162, which is usually projected but is retracted with a sliding operation of the slide lever 161.

As shown in FIG. 17, the separator locking device 160 is secured to the lid 30. At this time, the separator locking hook 162 is projected into the separator storing section 32. As shown in FIG. 17, on the free end of the separator 50, a separator locking groove 52, into which the separator locking hook 162 fits, is disposed.

The separator 50 is used when the lid 30 is opened. Sliding the slide lever 161 while the separator is in the stored position that is in parallel with the lid 30 (see FIG. 15) retracts the separator locking hook 162 once. At this time, the separator 50 is unlocked and rotated towards the horizontally projecting position (see FIGS. 16-17) using the restoring force of the separator spring (not shown) built into the damper shaft 51.

To store the separator 50, rotating the separator 50 towards the separator storing section 32 is all that is required. Rotating the separator 50 allows its free end to push in the separator locking hook 162 once. When the separator 50 is further rotated, the free end abuts against the bottom of the separator storing section 32, and, at this point, the separator locking hook 162 regains its initial position to project again using the restoring force of the spring (not shown) to fit into the separator locking groove 52 to thereby lock the separator 50 in the stored position.

As shown in FIGS. 7 and 18-20, the dust access space 170 runs through the back wall of the holder body 20 from the lid storing space 61 towards the interior of the holder body 20, and is provided to allow a fallen object (not shown), a coin, for example, which has fallen inside the lid storing space 61, to pass through.

As shown in FIGS. 7 and 18, a pair of dust access spaces 170 is formed in the holder body 20 on both the right and left sides. They are rectangular in shape with a small height and a width in excess of the diameter of a coin (not shown).

As shown in FIGS. 19-20, the dust access space 170 is opened or closed by rotating the tray 40. In other words, when the tray 40 is in the vertically folded position, as shown in FIG. 19, the dust access space 170 is closed; when the tray 40 is rotated to the horizontal bottom-raising position, as shown in FIG. 20, the dust access space 170 is opened. Thus, the coin that falls into the lid storing space 61 while the tray 40 is in the vertically folded position remains within the lid storing space 61, and, when the tray 40 is rotated to the horizontal bottom-raising position, falls to the bottom 22 of the holder body 20 through the opened dust access space 170.

The shape of the dust access space 170, however, is not limited to quadrangles, such as a rectangle, and may be formed as a slit. Moreover, the number of dust access spaces 170 is not limited to two, and may be one, or three, or more.

As shown in FIG. 18, an angle guide projection 171 with a slanted surface is provided between the left and right dust accesses spaces 170 at the bottom of the lid storing space 61 to guide the coin-towards the left or the right dust access space 170.

The mounting clips 180 are provided for mounting the holder body 20 to the center console of a vehicle (not shown). As shown in FIGS. 10-11, the mounting clips 180 are of an anchor type; the flange of the holder body 20 and the guide piece 60 are provided with two pieces each to allow for installation to the center console with a one-touch operation.

The operation of the cup holder 10 having the above features will be explained in the following three parts.
(1) How to open/close the lid 30
(2) How to use the tray 40
(3) How to use the separator 50

As shown in FIG. 2, to open the lid 30 that is closed, slightly pushing-down the free end is all that is required. When the lid 30 is pushed down, the latching device 90 is unlocked, and the lid 30 rotates upwardly about the lid shaft 31 utilizing the restoring force of the lid spring 70.

At this time, the damping force is applied by the lid rotary damper 80 to open the lid 30 silently and slowly. Then, as shown in FIG. 3, the lid 30 abuts its inner surface against the back surface of the holder body 20 to thereby be restricted at the maximally opened position.

At this point, the lid 30 is housed with one portion thereof being fitted into the lid storing space 61 located between the back surface of the holder body 20 and the guide piece 60.

To close the lid 30 that is open, rotating the lid 30 by holding the free end thereof is all that is required. As the lid 30 rotates, the latching device 90 also integrally rotates to approach the striker 91. When the lid 30 is further rotated, the latching device 90 locks in a condition in which the striker 91 is held therein, thereby locking the lid 30 in the closed state, as shown in FIG. 11.

As shown in FIG. 1, when the tray 40 is locked in the vertically folded position, a relatively tall PETE bottle C1 can be held within the holder body 20. In the case of holding a relatively short can C2, on the other hand, the bottom of the holder body 20 may be too low to allow for easy removal of the can C2.

In such an occasion, holding the free end of the tray 40 to rotate it downwardly is all that is required. When the tray 40 is rotated downwardly, the free end thereof pushes in the tray locking hook 142 once. When the tray 40 is further rotated, the lower surface of the free end abuts against the stepped section 23 of the holder body 20, and, at this point, the tray locking hook 142 regains its initial position to project again, using the restoring force of the spring (not shown) to fit into the tray locking groove 42, as shown in FIG. 16, to thereby lock the tray 40 in the horizontal bottom-raising position.

As shown in FIG. 16, the can C2 placed on the upper surface of the tray 40 is held in the holder body 20 in an easy-to-remove condition. When inserting a relatively tall PETE bottle C1, on the other hand, pushing in the push button 141 is all that is required, as shown in FIG. 15. Pushing the push button 141 causes the tray locking hook 142 to retract once. At this point, the tray 40 is unlocked and rotated towards the folded position by the restoring force of the tray spring 120.

At this time, damping force is applied by the tray rotary damper 130 to thereby fold the tray 40 silently and slowly. Then, the tray 40 abuts its outer surface against the inner side surface of the holder body 20, as shown in FIG. 16, to thereby be restricted at the maximally opened position.

The separator 50 is housed within the separator storing section 32 of the lid 30 when not in use, as shown in FIG. 5. To use the separator 50, sliding the slide lever 161 while the lid 30 is open is all that is required. Sliding the slide lever 161 causes the separator locking hook 162 to retract once. At this point, the separator 50 is unlocked and rotated towards the horizontally projecting position (see FIG. 16-17) by the restoring force of the separator spring (not shown) built into the damper shaft 51.

At this time, damping force is applied by the separator rotary damper (not shown) built into the damper shaft 51 to thereby unfold the separator 50 silently and slowly. When the separator 50 is in the horizontally projecting position, a can C2 inserted into the holder body 20 can be held without rattling. In the case of holding the short can C2, in particular, rattling is a common occurrence, and thus the use of the separator in conjunction with the tray 40 is effective.

When the separator 50 is not used, rotating the separator 50 towards the separator storing section 32 is all that is required. Rotating the separator 50 causes the free end thereof to push in the separator locking hook 162 once. When the separator 50 is further rotated, the free end abuts against the bottom of the separator storing section 32, and, at this point, the separator locking hook 162 regains its initial position to project again using the restoring force of the spring (not shown) to fit into the separator locking groove 52 to thereby lock the separator 50 in the stored position.

The disclosure of Japanese Patent Application No. 2004-229906, filed on Aug. 5, 2004, is incorporated in the application.

While the invention has been explained with reference to the specific embodiments, the explanation is illustrative and the invention is limited only by the appended claims.

What is claimed is:

1. An accessory holder comprising:
    a tubular holder body having an opening at a top thereof and a bottom upon which a small article inserted from the opening can be rested;
    a foldable tray rotatably supported at mid height of the accessory holder operable to hold the small article by rotating from a vertical folded position to a horizontal position;
    biasing means provided between said foldable tray and the tubular holder body operable to bias said foldable tray from said horizontal position towards said vertical folded position;
    damping means operable to damp a rotational force of said foldable tray and operable to be rotated by a bias force of said biasing means; and
    locking means operable to lock said foldable tray in said horizontal position against the bias force of said biasing means.

2. An accessory holder according to claim 1, further comprising:
    a lid rotatably supported by the tubular holder body to open the top of the tubular holder body, and
    a dust access space,
    wherein the tubular holder body further comprises a guide piece extending upwardly and maintaining a lid housing space for housing said lid, said dust access space running from said lid housing space through an interior of the tubular holder body to allow a fallen object falling into said lid housing space to pass therethrough.

3. An accessory holder according to claim 1, wherein said locking means includes a locking hook formed at one side of holder body to engage the foldable tray, and an operation button connected to the locking hook and located at an upper surface of the holder body.

4. An accessory holder according to claim 3, further comprising:
    a lid rotatably supported by the tubular holder body for opening the top of the tubular holder body, said lid further comprising a foldable separator rotatably supported at an inner surface of said lid operable to separate an interior of the tubular holder body into plural sections by rotating from a stored position in parallel with said lid towards a horizontal projecting position;
    biasing means provided between said foldable separator and said lid operable to bias said foldable separator from the stored position to the horizontal projecting position;
    damping means operable to damp a rotational force of said foldable separator and operable to be rotated by a bias force of said biasing means; and
    locking means operable to lock said foldable separator in the stored position against the bias force of said biasing means.

5. An accessory holder according to claim 4, wherein the tubular holder body further includes a guide piece extending upwardly and maintaining a lid housing space for housing said lid; and a dust access space running from the interior of the tubular holder body through said lid housing space to allow an object that falls into said lid housing space to pass therethrough.

* * * * *